United States Patent

Vispute et al.

(10) Patent No.: US 12,407,258 B2
(45) Date of Patent: Sep. 2, 2025

(54) FLOATING GATE DRIVER WITH PROGRAMMABLE DRIVE STRENGTH FOR A WIDE RANGE OF UNIVERSAL SERIAL BUS (USB) POWER DELIVERY APPLICATIONS

(71) Applicant: Cypress Semiconductor Corporation, San Jose, CA (US)

(72) Inventors: Hemant P. Vispute, Bangalore (IN); Partha Mondal, Paschim Medinipur (IN); Tudu Rushika Banam Balia, Bangalore (IN); Arun Khamesra, Bangalore (IN); Pulkit Shah, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 218 days.

(21) Appl. No.: 17/696,781

(22) Filed: Mar. 16, 2022

(65) Prior Publication Data

US 2023/0299676 A1    Sep. 21, 2023

(51) Int. Cl.
 *H02M 3/158*    (2006.01)
 *H02M 1/08*    (2006.01)
 *H02M 1/088*    (2006.01)

(52) U.S. Cl.
 CPC .......... *H02M 3/1582* (2013.01); *H02M 1/08* (2013.01); *H02M 1/088* (2013.01)

(58) Field of Classification Search
 CPC ....... H02M 1/08; H02M 1/088; H02M 3/1582
 See application file for complete search history.

(56) References Cited

U.S. PATENT DOCUMENTS

| | | | | |
|---|---|---|---|---|
| 11,937,351 | B2* | 3/2024 | Lu | H05B 45/34 |
| 2005/0001653 | A1* | 1/2005 | Ahmad | H03K 17/164 |
| | | | | 326/87 |
| 2008/0169796 | A1* | 7/2008 | Buethker | H02M 3/1582 |
| | | | | 323/282 |
| 2018/0159521 | A1* | 6/2018 | Tsurumaru | H03K 17/166 |
| 2019/0109585 | A1* | 4/2019 | Tang | H03K 17/6871 |
| 2019/0379272 | A1* | 12/2019 | Carpenter | H02M 3/155 |
| 2020/0220460 | A1* | 7/2020 | Dharmalinggam | H02M 3/157 |

(Continued)

OTHER PUBLICATIONS

Analog Devices, 40V USB Type-C Power Delivery Buck-Boost Controller, 20 pages, 2020.

*Primary Examiner* — Gustavo A Rosario-Benitez

(57) ABSTRACT

Universal Serial Bus Type-C (USB-C) controllers with a floating gate driver with programmable drive strength for a wide range of USB power delivery applications in electronic devices described. A USB-C controller includes a floating gate driver and control logic. The floating gate driver includes p-channel field-effect transistors (FETs) coupled in parallel between a first terminal and a second terminal and p-channel pre-gate drivers. Each p-channel pre-gate driver is coupled to a gate of one of the p-channel FETs. The floating gate driver includes n-channel FETs coupled in parallel between the second terminal and a third terminal and n-channel pre-gate drivers, each n-channel pre-gate driver being coupled to a gate of one of the plurality of n-channel FETs. The control logic sends one or more control signals to activate a first number of p-channel pre-gate drivers and a second number of n-channel pre-gate drivers based on an output voltage.

17 Claims, 12 Drawing Sheets

(56) References Cited

U.S. PATENT DOCUMENTS

| | | | |
|---|---|---|---|
| 2020/0303916 A1* | 9/2020 | Ontiveros | H02H 3/16 |
| 2023/0261494 A1* | 8/2023 | Smith | H02J 7/00712 |
| | | | 320/107 |

* cited by examiner

| Output Voltage | Peak Efficiency |
|---|---|
| 5V | 92.28% |
| 9V | 95.48% |
| 15V | 96.4% |
| 20V | 95.82% |

FIG. 4

FLOATING GATE DRIVER WITH PROGRAMMABLE DRIVE STRENGTH FOR A WIDE RANGE OF UNIVERSAL SERIAL BUS (USB) POWER DELIVERY APPLICATIONS

TECHNICAL FIELD

This disclosure relates to integrated circuits (ICs) that control Universal Serial Bus (USB) power delivery to electronic devices, including floating gate drivers with programmable drive strength for a wide range of USB power delivery applications.

BACKGROUND

Various electronic devices (e.g., such as smartphones, tablets, notebook computers, laptop computers, hubs, chargers, adapters, etc.) are configured to transfer power through USB connectors according to USB power delivery protocols defined in various revisions of the USB Power Delivery (USB-PD) specification. For example, in some applications, an electronic device may be configured as a power consumer to receive power through a USB connector (e.g., for battery charging). In contrast, in other applications, an electronic device may be configured as a power provider to provide power to another connected device through a USB connector.

BRIEF DESCRIPTION OF THE DRAWINGS

The disclosure is illustrated by way of example, and not of limitation, in the figures of the accompanying drawings.

FIG. 4 is a table of output voltage and peak efficiency of a buck-boost converter controlled by programmable floating gate drivers according to at least one embodiment.

DETAILED DESCRIPTION

Figure 1A:
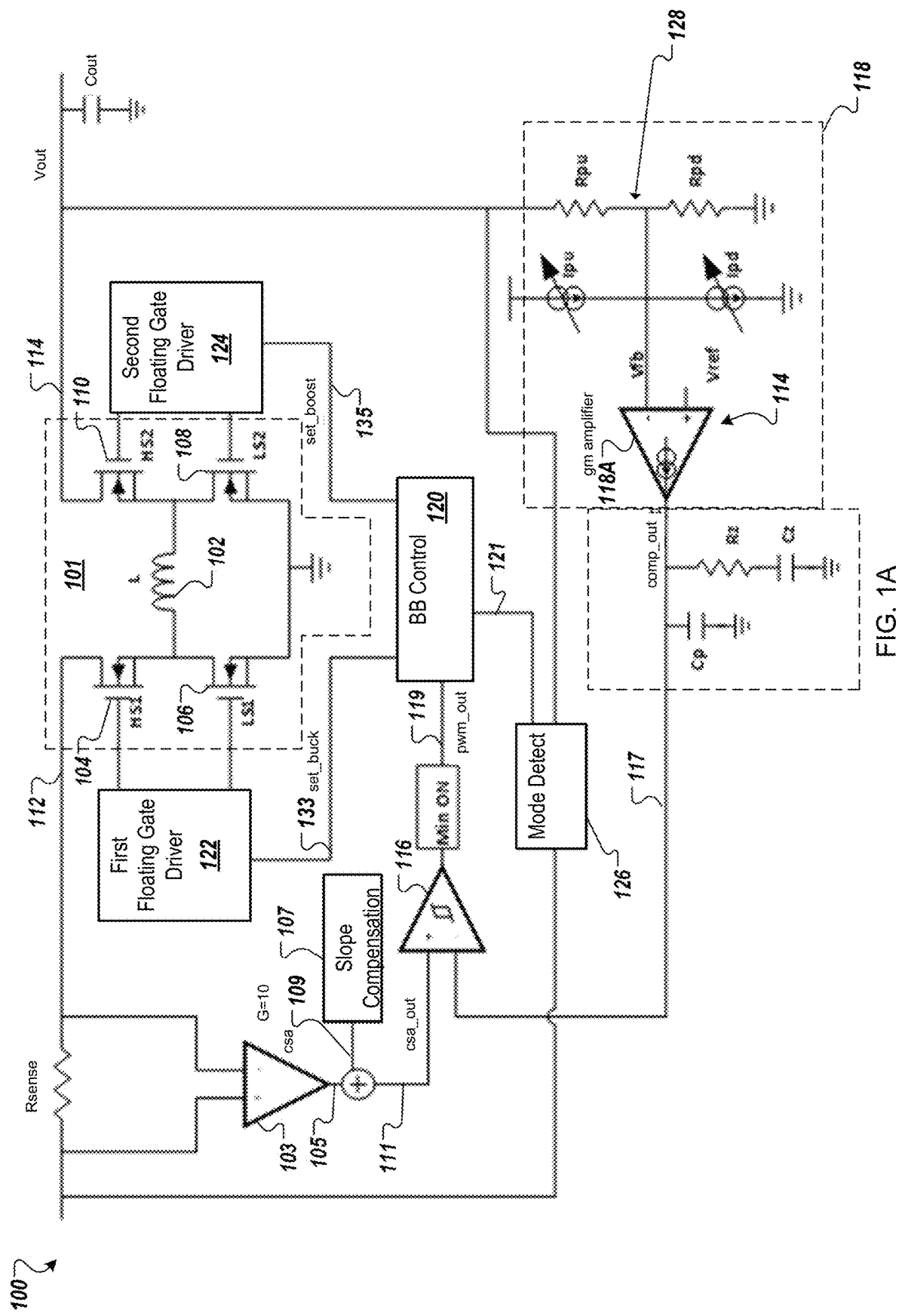
FIG. 1A is a block diagram of a Universal Serial Bus (USB) Type-C controller with programmable floating gate drivers coupled to a buck-boost converter according to at least one embodiment.

The following description sets forth numerous specific details such as examples of specific systems, components, methods, and so forth, in order to provide a good understanding of various embodiments of the techniques described herein for providing programmable floating gate driver circuits with programmable drive strengths, such as used in USB power delivery (PD) applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples" are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for providing a Universal Serial Bus Type-C (USB-C) controller with a floating gate driver with programmable drive strength for a wide range of USB power delivery applications in electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket personal computers (PCs), etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery.

As used herein, a "USB-enabled" device or system refers to a device or system that includes, is configured with, or is otherwise associated with a USB connector interface. A USB-enabled electronic device may comply with at least one release of a Universal Serial Bus (USB) specification. Examples of such USB specifications include, without limitation, the USB Specification Revision 2.0, the USB 3.0 Specification, the USB 3.1 Specification, the USB 3.2 Specification, and/or various supplements, versions, and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (also referred to herein as "USB-C"), is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (or communication channel, denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may comply with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that both devices can accommodate, and can be dynamically re-negotiated (e.g., without device un-plugging) upon request by either device and/or in response to various events and conditions, such as power role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification. The IC controller can be implemented in a USB Type-C device. The IC controller can be implemented in a USB device.

Power delivery in accordance with the USB-PD specification(s) can be embodied in several different types of USB Type-C applications. Examples of such types of Type-C applications include, but may not be limited to: a downstream facing port (DFP) application, in which an IC controller with a USB-PD subsystem is configured to provide a downstream-facing USB port (e.g., in a USB-enabled host device); an upstream facing port (UFP) application, in which an IC controller with a USB-PD subsystem is configured to provide an upstream-facing USB port (e.g., in a USB-enabled peripheral device or adapter); a dual role port (DRP) USB application, in which an IC controller with a USB-PD subsystem is configured to support both DFP and UFP applications on the same USB port (e.g., a USB Type-C port that is configured to operate as either a power provider or a power consumer or can alternate between these two roles dynamically by using USB-PD power role swap); and an active cable application, in which an IC controller with a USB-PD subsystem is disposed into, and configured to operate an electronically marked cable assembly (EMCA) Type-C cable.

Conventional USB-PD applications can use a four-switch buck-boost direct current-to-direct current (DC-to-DC) converter. The buck-boost converter is designed for a wide range of output power applications, such as from 10 watts (W) to 100 W. The output voltage can vary from 3.3 volts (V) to 21.5V dynamically for USB-PD applications. In buck-boost topology, a high-side driver is used to switch a first switch (Q1)(HS1) and a fourth switch (Q4)(HS2), and a low-side driver is used to switch a second switch (Q2) (LS1) and a third switch (Q3)(LS2). The switches can be field-effect transistors (FETs), and a switch resistance of the FETs can be in a range of 4-20 m ohms to keep low conduction loss. The gate capacitance of low-impedance switches can vary from 0.5 nanofarads (nF) to 6 nF. The switching frequency of the conversion varies from 150 kilohertz (kHz) to 600 kHz, depending on the applications. As such, the gate drivers are designed with fast edges, such as less than 10 nanoseconds (ns) and low output resistance (approximately 1 ohm) to drive a high-load capacitance to keep switching losses low. However, fast switching with high-load capacitance causes electromagnetic interference (EMI) and electromagnetic compatibility (EMC) issues. Fast switching with high-load capacitance by the gate driver requires a special ground plane and a decoupling capacitor for even lower power applications. A series gate resistance is added to each FET to meet EMI/EMC based on application requirements in one conventional solution. Series resistance is added for each pull-up/pull-down path to optimize the efficiency of the buck-boost converter. This conventional solution requires external passive components (e.g., twelve passive resistors and four diodes) that increase the overall cost to meet EMI/EMC requirements. Mounting the passive components on the board needs multiple iterations and board re-work to optimize efficiency and EMI/EMC performance. Also, the high-gate series resistance is needed if the power changes dynamically, especially in USB-PD applications, which reduces the overall efficiency of the converter.

Aspects of the present disclosure address the deficiencies described above and other challenges by providing a floating gate driver with programmable drive strength to support a wide range of buck-boost converters. Aspects of the present disclosure address the deficiencies described above and other challenges by providing a floating gate driver with a very wide programmable drive strength between 1 ohm and 30 ohms for each floating gate driver (e.g., a high-side driver and a low-side driver). Aspects of the present disclosure can dynamically control the programmable drive strengths of the floating gate drivers through firmware based on an output power level. Aspects of the present disclosure can provide scalability by the floating gate driver architecture being scalable from one silicon technology to another. Aspects of the present disclosure can provide improved performance by providing a scalable voltage architecture between approximately 3.3V to approximately 30V.

In at least one embodiment, a USB-C controller includes a floating gate driver and control logic. The floating gate driver includes p-channel field-effect transistors (FETs) coupled in parallel between a first terminal and a second terminal and p-channel pre-gate drivers. Each p-channel pre-gate driver is coupled to a gate of one of the p-channel FETs. The floating gate driver includes n-channel FETs coupled in parallel between the second terminal and a third terminal and n-channel pre-gate drivers, each n-channel pre-gate driver being coupled to a gate of one of the plurality of n-channel FETs. The control logic sends one or more control signals to activate a first number of p-channel pre-gate drivers and a second number of n-channel pre-gate drivers based on an output voltage of a buck-boost converter (or other types of DC-to-DC converters). These technologies can be deployed in any USB-enabled device or system.

FIG. 1A is a block diagram of a Universal Serial Bus (USB) Type-C controller 100 with programmable floating gate drivers 122, 124, coupled to a buck-boost converter according to at least one embodiment. The USB controller 100 includes a buck-boost (BB) converter 101 in at least one embodiment. Although illustrated deployed within the USB controller 100, the present BB architecture can be employed in other BB applications and contexts where a programmable floating gate driver is used, such as, for example, a buck converter, a boost converter, a BB converter, or other DC-to-DC converters.

In various embodiments, the BB converter 101 includes an inductor 102, a first high-side switch 104 (or HS1), a second high-side switch 110 (or HS2), a first low-side switch 106 (or LS1), and a second low-side switch 108 (or LS2). In one embodiment, these switches are n-type field-effect transistors (NFETs), as illustrated. In another embodiment, although not illustrated, the high side switches are p-channel field-effect transistors (PFETs). In various embodiments, the first high-side switch 104 is coupled between an input terminal 112 and a first side of the inductor 102 of the BB converter 101. The high-side switch 110 is coupled between a second side of the inductor 102 and an output terminal 114. The first low-side switch 106 is coupled between the first side of the inductor 102 and a ground of the BB converter 101. The second low-side switch 108 is coupled between the second side of the inductor and the ground. The input terminal 112 can carry an input voltage (Vin), and the output terminal 114 can carry an output voltage (Vout) of the BB converter 101. The BB converter 101 can include an input capacitor (Cin) coupled to the input terminal 112 and an output capacitor (Cout) coupled to the output terminal 114.

For such a BB converter 101, the input capacitor (Cin), output capacitor (Cout), and the inductor 102 can be designed based on input, output, and load current requirements. In various embodiments, the design of the BB converter 101 (or a larger system or device that includes the BB converter 101) seeks to limit the maximum current to a certain amperage and wattage requirement. Once the total output power range is known, one can determine input current requirements. From input current requirements, one can determine values for the capacitance of the input and output capacitors (Cin and Cout) and the inductance of the inductor 102.

In various embodiments, the USB controller 100 further includes a current sense amplifier (CSA) 103, a comparator 116, an error amplifier (EA) circuit 118, BB control logic 120, a first programmable floating gate driver 122, a second programmable floating gate driver 124, and mode detect logic 126. The CSA 103 can measure an input current of the buck-boost converter 101 and can output a CSA signal 105 indicative of the input current. A slope compensation circuit 107, which can include slope compensation logic and a slope compensation capacitor, is coupled to an output of CSA 103. When enabled, the slope compensation circuit 107 can add an offset signal 109 (slope compensation offset) to CSA signal 105, generating an offset CSA signal 111. In some cases, the offset signal 109 is a current or a charge. In other cases, the offset signal 109 can be a voltage signal if other circuits are used to add the offset signal 109 to CSA signal 105.

In various embodiments, the BB converter 101 can work in either constant voltage (CV) or constant current (CC) mode depending on the load conditions. Hence, a transconductance (Gm) amplifier architecture is generally used for the EA circuit 118 in controlling the buck-boost converter

101. The Gm amplifier 118A works on the principle of delivering output current proportional to the input voltage difference.

In at least one embodiment, the comparator 116 receives the CSA signal 111 and an EA signal 117, e.g., an output compensation signal, from the EA circuit 118. The EA circuit 118 can include a transconductance (Gm) amplifier 118A. In another embodiment, the EA circuit 118 includes a pair of transconductance (Gm) amplifiers, a first Gm amplifier that operates in a constant voltage mode, and a second transconductance amplifier that operates in a constant current mode.

In at least some embodiments, the Gm amplifier 118A operates in the CV mode using the voltage tapped off of the voltage bus (Vbus) output of the BB converter 101. For example, the Gm amplifier 118A can adjust an output current of the EA signal 117 based on a difference between first positive and negative inputs. The first positive input can receive a first voltage reference (Vref_cv), e.g., related to a target constant voltage, and the first negative input can be coupled to a tap point of a voltage divider 128 coupled between the Vbus and ground. The tap point provides a constant feedback voltage (Vfb) from the Vbus. This voltage (Vfb) connected to the first negative input can be tuned by sourcing current from a variable current source (Ipu) or sinking current to a variable current sink (Ipd). These Ipu sourcing current or Ipd sinking current alters the current flowing in the resistor divider on the Vbus, which changes the feedback voltage (Vfb) at the input of the transconductance amplifier 118A. The Vfb voltage can help change the Vbus voltage, thus meeting USB bus specifications of between 3V and 21V.

In at least some embodiments, the second Gm amplifier operates in CC mode using current sensed from the voltage bus (Vbus). For example, the second Gm amplifier can adjust the output current of the EA signal 117 based on a difference between second positive and negative inputs. The second positive input can receive a second reference voltage (Vref_cc), e.g., related to a target constant current, and the second negative input can be coupled to an output current sense amplifier (CSA). The output CSA can be coupled to a second sense resistor positioned inline along the voltage bus (Vbus) to sense the load current of the Vbus.

In these embodiments, the USB controller 100 also includes external compensation circuitry 138 at the output of the EA circuit 118 to help shape the EA signal 117 and enable buffering the EA signal 117 while the comparator 116 performs a comparison, which is discussed below. In some embodiments, the external compensation circuitry 138 includes at least a resistor (Rz) connected in series to a first capacitor (Cz) and a second capacitor (Cp) connected in parallel. The gain of the EA circuit 118 can be understood to be governed by Kf*Gm*Rz, e.g., where Kf is a programmable constant, Gm is the transconductance of the EA circuit 118, and Rz is the resistance of the resistor, Rz. Thus, two ways in which to adjust the gain and thereby amplitude of the closed-loop control response are to adjust the programmable constant Kf or the Gm of the EA circuit 118.

In various embodiments, the comparator 116 compares the CSA signal 111 and the EA signal 117 and provides a control signal 119, referred to as pulse width modulation (PWM) out (or pwm_out) signal, to the BB control logic 120. In one embodiment, the EA control loop as referred to herein refers to at least the constant voltage (CV) and constant current (CC) paths, the EA circuit 118, the CSA 103, and the comparator 116 that adjusts the PWM output signal to the BB control logic 120 based on the input voltage (Vin), the output voltage (Vout or Vbus), and the reference voltages (Vref_cv and Vref_cc), the latter of which are programmable.

In various embodiments, the BB control logic 120 receives the control signal 119 and a mode signal 121 from the mode detect logic 126. The mode detect logic 126 can determine a mode and a transition between modes based on the output voltage (Vout) and the input voltage (Vin) and outputs the mode signal 121 accordingly. If Vin is higher than Vout, the mode detect logic 126 will output the mode signal 121 indicative of buck mode in various embodiments. In contrast, if Vout is higher than Vin, the mode detect logic 126 will output the mode signal 121 indicative of boost mode. In some embodiments, the mode detect logic is included within the BB control logic.

The BB control logic 120 can use the control signal 119 and the mode signal 121 to control a mode of the buck-boost converter 101. In particular, the BB control logic 120 can send a first control signal 133 (set_buck) to the first programmable floating gate driver 122 that controls the first high-side switch 104 and the first low-side switch 106 of the buck-boost converter 101. The BB control logic 120 can further send a second control signal 135 (set_boost) to the second programmable floating gate driver 124 that controls the second high-side switch 110 and the second low-side switch 108 of buck-boost converter 101.

As described above, conventional systems use external passive components and board optimizations to meet EMI/EMC requirements for various USB-PD applications since the buck-boost converter is designed for a wide range of output power applications, and the output voltage can vary from 3.3V to 21.5V dynamically for USB-PD application. According to the techniques described herein, the programmable floating gate drivers 122, 124, in connection with the BB control logic 120, can operate with different programmable drive strengths to support a wide range of DC-to-DC converters. In at least one embodiment, the programmable drive strengths can vary between approximately 1 ohm and 30 ohms for each floating gate driver (e.g., a high-side driver and a low-side driver). In at least one embodiment, the BB control logic 120 can use firmware to read digital samples of the output power level and dynamically program the drive strength of each of the programmable floating gate drivers 122, 124, individually or collectively. Additional details of the programmable floating gate drivers 122, 124 are described in more detail with respect to FIG. 2.

Figure 1B:
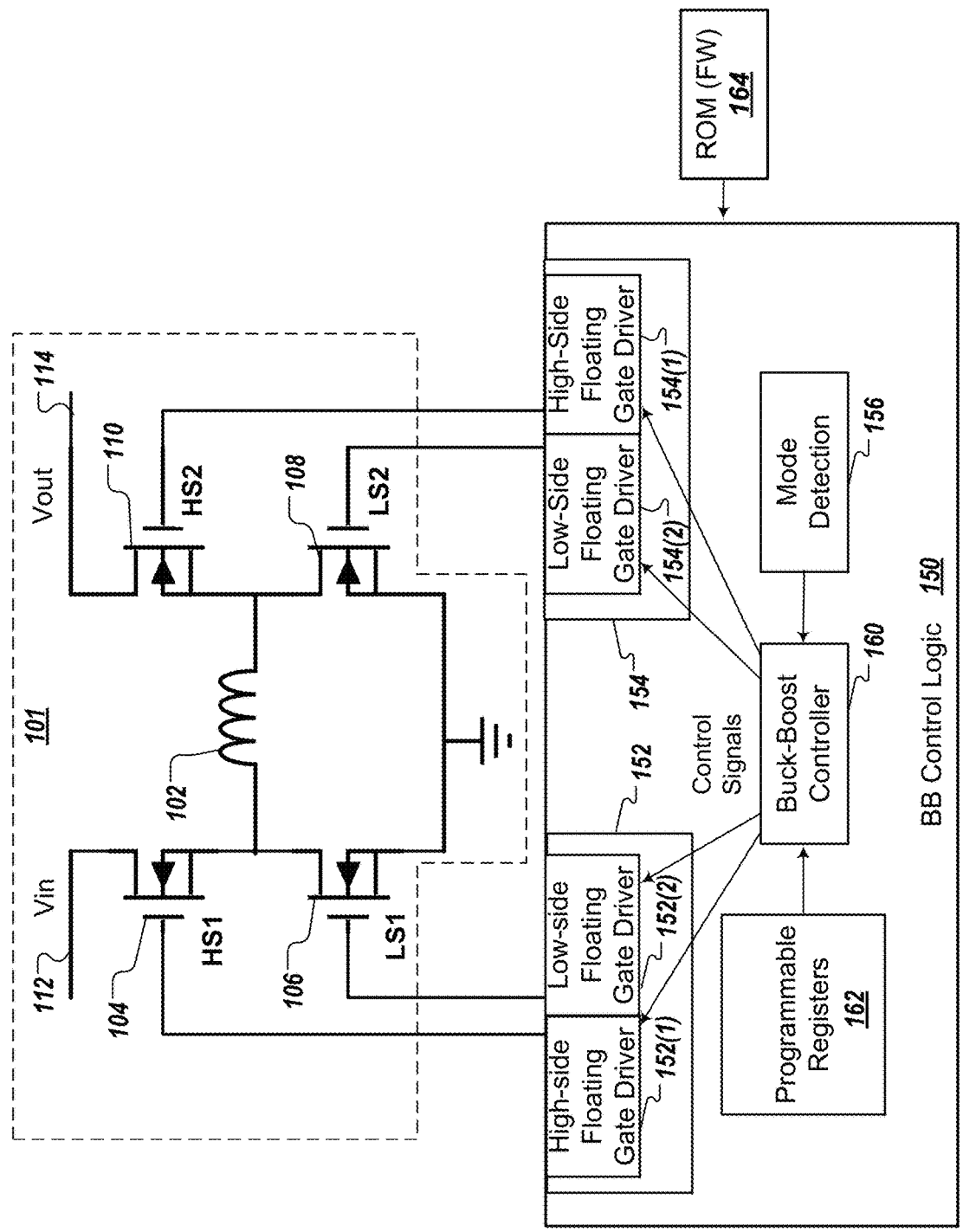
FIG. 1B is a block diagram of buck-boost (BB) control logic 150 programmed to control a buck-boost converter according to at least one embodiment.

FIG. 1B is a block diagram of buck-boost (BB) control logic 150 programmed to control a buck-boost converter according to at least one embodiment. In at least one embodiment, the BB control logic 150 is the BB control logic 120 of FIG. 1A. In some embodiments, the BB control logic 150 is a power controller, which can be a firmware-programmed (or firmware-controlled) processor, microprocessor, ASIC, microcontroller, or the like. In at least some embodiments, the BB control logic 150 includes a programmable buck-side floating gate driver 152, including a first high-side floating gate driver 152(1) and a first low-side floating gate driver 152(2), and a programmable boost-side floating gate driver 154, including a second high-side floating gate driver 154(1) and a second low-side floating gate driver 154(2). The BB control logic 150 can also include mode detection logic 156, a buck-boost controller 160, and programmable registers 162.

In these embodiments, the programmable buck-side floating gate driver 152 can dynamically change the timing of activating the first high-side switch 104 and the first low-side switch 106, as directed by the BB control logic 150.

More specifically, the first high-side floating gate driver 152(1) can control the first high-side switch 104, and the first low-side floating gate driver 152(2) can control the first low-side floating switch 106. Similarly, the programmable boost-side floating gate driver 154 can make dynamic changes to the second high-side switch 110 and the second low-side switch 108, as directed by the BB control logic 150. More specifically, the second high-side floating gate driver 154(1) can control the second high-side switch 110, and the second low-side floating gate driver 154(2) can control the second low-side switch 108. The buck-boost controller 160 can orchestrate or operate as central logic within the BB control logic 150, which can allocate timing of switching and frequency of operation of the buck-boost converter 101 between the programmable buck-side floating gate driver 152 and the programmable boost-side floating gate driver 154.

In various embodiments, the BB control logic 150 is coupled to other components and voltage or current signals of the USB controller 100, and optionally also to an attached USB device, and thus can gather values of the external parameters. One of the parameters includes a determination, by the mode detection logic 156, in what mode the buck-boost converter 101 is operating. In some embodiments, the mode detection logic 156 is the same as the mode detect logic 126 of FIG. 1A.

In at least some embodiments, the BB control logic 150 includes or has access to the programmable registers 162. In various embodiments, the programmable registers 162 are hardware registers, a volatile memory location (e.g., of local memory such as cache), or a non-volatile memory location (e.g., in on-chip flash memory), or the like. In these embodiments, the programmable registers 162 can be employed to store particular operating parameters, such as transconductance (Gm), frequency, bandwidth, duty cycle, and other such operating parameters, as will be discussed in more detail, which impact the operations of the buck-boost converter 101 and the USB controller 100.

As described above, conventional systems use external passive components and board optimizations to meet EMI/EMC requirements for various USB-PD applications since the buck-boost converter is designed for a wide range of output power applications, and the output voltage can vary from 3.3V to 21.5V dynamically for USB-PD application. According to the techniques described herein, the programmable buck-side floating gate driver 152 and the programmable boost-side floating gate driver 154, in connection with the buck-boost controller 160, can operate with different programmable drive strengths to support a wide range of DC-to-DC converters. In at least one embodiment, the programmable drive strengths can vary between approximately 1 ohm and 30 ohms for each floating gate driver (e.g., a high-side driver and a low-side driver). In at least one embodiment, the buck-boost controller 160 can use firmware to read digital samples of the output power level and dynamically program the drive strength of each of the programmable buck-side floating gate driver 152 and the programmable boost-side floating gate driver 154, individually or collectively. Additional details of the programmable buck-side floating gate driver 152 and the programmable boost-side floating gate driver 154 are described in more detail with respect to FIG. 2.

In some embodiments, operations described herein include executing firmware (FW) to program a microprocessor to instantiate the buck-boost controller 160 and providing at least an input voltage (Vin) and an output voltage (Vout) of the buck-boost converter 101 to the microprocessor. The microprocessor, e.g., operating the mode detection logic 156, can use these Vin and Vout values to determine the mode in which the buck-boost converter 101 is operating. In other embodiments, firmware (FW) can read digital samples of the output voltages, such as generated by a sampling circuit or an analog-to-digital converter (ADC), and determine a drive strength parameter to control a number of pre-gate drivers to be activated to set a programmable drive strength of the programmable floating gate driver (e.g., 152, 154), as illustrated in FIG. 2.

Figure 2:
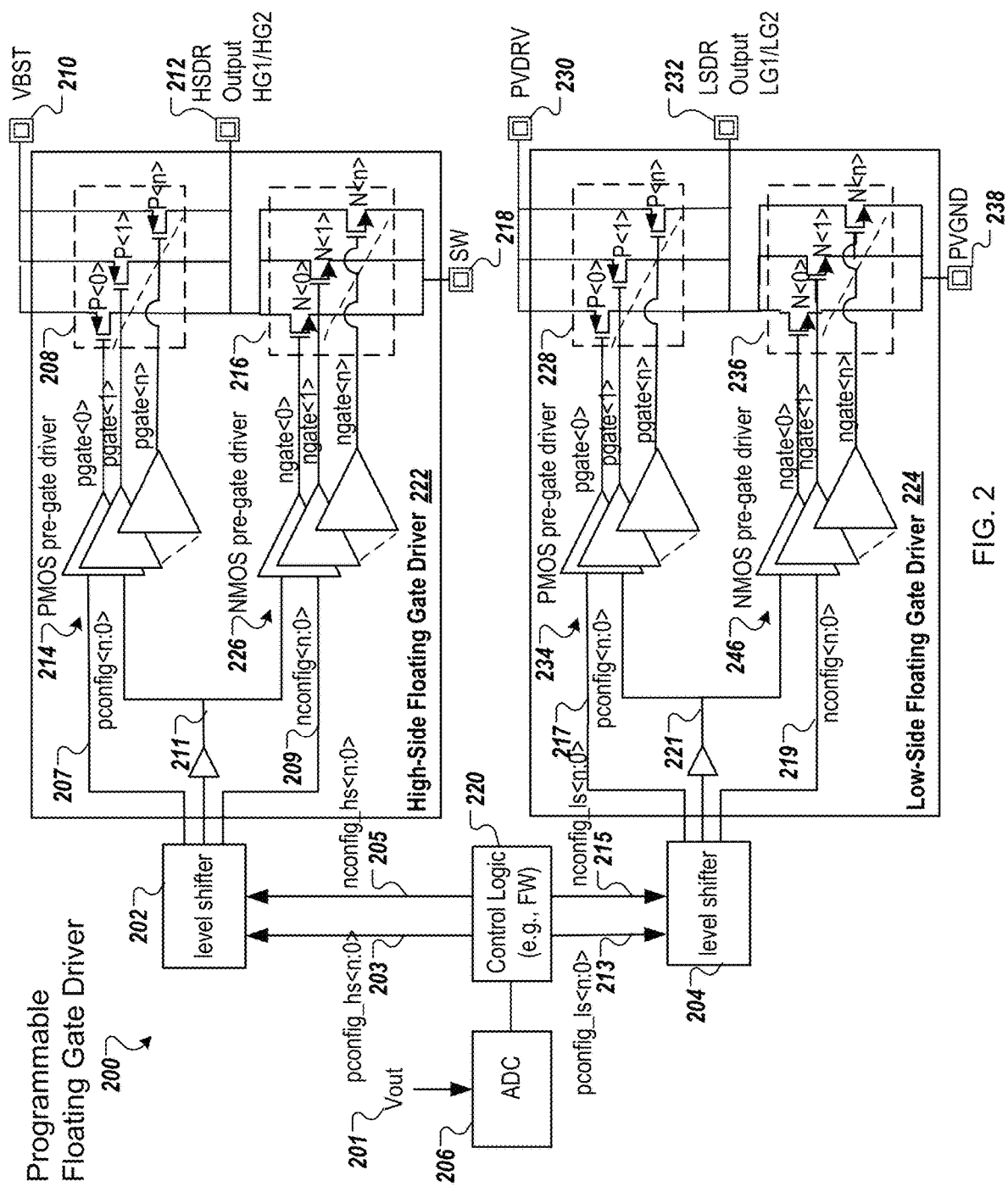
FIG. 2 is a block diagram of a programmable floating gate driver with a high-side floating gate driver and a low-side floating gate driver according to at least one embodiment.

FIG. 2 is a block diagram of a programmable floating gate driver 200 with a high-side floating gate driver 222 and a low-side floating gate driver 224 according to at least one embodiment. The programmable floating gate driver 200 includes the high-side floating gate driver 222, the low-side floating gate driver 224, a first level shifter 202, and a second level shifter 204. The first level shifter 202 and the second level shifter 204 are coupled to control logic 220. Control logic 220 is similar to the BB control logic 120 of FIG. 1A or the BB control logic 150 of FIG. 1B. The control logic 220 is coupled to an ADC 206. The ADC 206 is coupled to an output (Vout) of a buck-boost converter (or other DC-to-DC converters). The ADC 206, or other sampling circuits, can measure or receive an output voltage 201 and generate a digital value voltage representing an output voltage of the buck-boost converter (or other DC-to-DC converters). The digital values can be stored in memory. In at least one embodiment, the control logic 220 executes firmware that reads the output voltage's digital values and configures a drive strength of the programmable floating gate driver 200 dynamically for USB-PD applications. The drive strength can be set using different drive strength parameters corresponding to a resistance of the programmable floating gate driver 200, such as between 1 ohm and 30 ohms. The drive strength can be configured through the firmware for different applications to get the best EMI/EMC and efficiency performance.

In at least one embodiment, the programmable floating gate driver 200 includes two floating gate drivers, including a high-side floating gate driver 222 and a low-side floating gate driver 224. The programmable floating gate driver 200 includes a single floating gate driver in other embodiments. The programmable floating gate driver 200 includes more than two floating gate drivers in another embodiment. In another embodiment, a controller can include two programmable floating gate drivers 200, which each includes one or more floating gate drivers. For example, a buck-boost converter includes four switches, including a first high-side switch, a first low-side switch, a second high-side switch, and a second low-side switch. Two of these switches can be controlled by the programmable floating gate driver 200, and the other two switches can be controlled by a second programmable floating gate driver that is identical to the programmable floating gate driver 200. The driver strengths of each of the four floating gate drivers can be controlled at the same level or different levels. Each of the four floating gate drivers can be individually controlled or collectively controlled based on the measured output voltage. Alternatively, the drive strengths can be programmed for different applications, different operation modes, or the like.

In at least one embodiment, the high-side floating gate driver 222 includes a first set of p-channel FETs 208 coupled in parallel between a first terminal 210 and a second terminal 212 and a first set of p-channel pre-gate drivers 214, each p-channel pre-gate driver being coupled to a gate of one of the first set of p-channel FETs 208. The high-side floating gate driver 222 also includes a first set of n-channel FETs 216 coupled in parallel between the second terminal 212 and a third terminal 218 and a first set of n-channel pre-gate drivers 226, each n-channel pre-gate driver being coupled to a gate of one of the first set of n-channel FETs 216. The first terminal 210 (VBST1 or VBST2) can be coupled to a first voltage potential or node associated with a driver power source (PVDRV). For example, a diode can be coupled between the first voltage potential or node and the driver power source. The second terminal 212 (HG1 or HG2) can be coupled to a high-side switch (HS1 or HS2 not illustrated in FIG. 2) (e.g., 104 or 110). The third terminal 218 (SW1 or SW2) can be coupled to a body terminal of the high-side switch (HS1 or HS2), the source terminal & body terminal of the first high side switch coupled to a first side (SW1) of the inductor 102 of the BB converter 101 in FIG. 1A & FIG. 2B, the source terminal & body terminal of the second high side switch coupled to a second side (SW2) of the inductor 102 of the BB converter 101 in FIG. 1A & FIG. 2B. The control logic 220 can determine a first drive strength parameter based on a digital representation of the output voltage 201 and can output one or more control signals to the high-side floating gate driver 222, such as a first control signal 203 (e.g., pconfig_hs<n:0) to control or activate a specific number of the p-channel pre-gate drivers 214 and a second control signal 205 (e.g., nconfig_hs<n:0) to control or activate a specific number of the n-channel pre-gate drivers 226, based on the first drive strength parameter. In some cases, the specific number of p-channel pre-gate drivers 214 and the specific number of n-channel pre-gate drivers 226 are the same. In other embodiments, the specific number of p-channel pre-gate drivers 214 and the specific number of n-channel pre-gate drivers 226 are different. The first control signal 203 and the second control signal 205 can be multi-bit signals, such as first and second codes. The first control signal 203 and the second control signal 205 can be output in a first voltage level. The first level shifter 202 can receive the first control signal 203 and the second control signal 205 and adjust the first control signal 203 and the second control signal 205 to a second voltage level. In particular, the first level shifter 202 can output a first control signal 207 at the second voltage level that can be used to select or activate the specific number of p-channel pre-gate drivers 214 to achieve the drive strength specified by the first drive strength parameter. The first level shifter 202 can output a second control signal 209 at the second voltage level that can be used to select or activate the specific number of n-channel pre-gate drivers 226 to achieve the drive strength specified by the first drive strength parameter. The first level shifter 202 also outputs an enable signal 211 that can be input into the specified number of p-channel pre-gate drivers 214, selected or activated by the first control signal 207, and the specified number of n-channel pre-gate drivers 226, selected or activated by the second control signal 209. In at least one embodiment, the high-side floating gate driver 222 includes a buffer that can buffer the enable signal 211.

In at least one embodiment, the low-side floating gate driver 224 includes a second set of p-channel FETs 228 coupled in parallel between a first terminal 230 and a second terminal 232 and a second set of p-channel pre-gate drivers 234, each p-channel pre-gate driver being coupled to a gate of one of the second set of p-channel FETs 228. The low-side floating gate driver 224 also includes a second set of n-channel FETs 236 coupled in parallel between the second terminal 232 and a third terminal 238 and a second set of n-channel pre-gate drivers 246, each n-channel pre-gate driver being coupled to a gate of one of the second set of n-channel FETs 236. The first terminal 230 can be coupled to the first voltage potential or node associated with the driver power source (PVDRV). The second terminal 232 (LG1 or LG2) can be coupled to a low-side switch (LS1 or LS2 not illustrated in FIG. 2) (e.g., 106 or 108). The third terminal 238 can be coupled to a ground potential or node (PVGND).

The control logic 220 can determine the first drive strength parameter based on the digital representation of the output voltage 201 and can output one or more control signals to the low-side floating gate driver 224, such as a first control signal 213 (e.g., pconfig_ls<n:0) to control or activate a specific number of the p-channel pre-gate drivers 234 and a second control signal 215 (e.g., nconfig_ls<n:0) to control or activate a specific number of the second set of n-channel pre-gate drivers 246, based on the first drive strength parameter. In some cases, the specific number of p-channel pre-gate drivers 234 and the specific number of n-channel pre-gate drivers 246 are the same. In other embodiments, the specific number of p-channel pre-gate drivers 234 and the specific number of n-channel pre-gate drivers 246 are different. The first control signal 213 and the second control signal 215 can be multi-bit signals, such as first and second codes. The first control signal 213 and the second control signal 215 can be output in a first voltage level. The second level shifter 204 can receive the first control signal 213 and the second control signal 215 and adjust the first control signal 213 and the second control signal 215 to a second voltage level. In particular, the second level shifter 204 can output a first control signal 217 at the second voltage level that can be used to select or activate the specific number of p-channel pre-gate drivers 234 to achieve the drive strength specified by the first drive strength parameter. The second level shifter 204 can output a second control signal 219 at the second voltage level that can be used to select or activate the specific number of the second set of n-channel pre-gate drivers 246 to achieve the drive strength specified by the first drive strength parameter. The second level shifter 204 also outputs an enable signal 221 that can be input into the specified number of p-channel pre-gate drivers 234, selected or activated by the first control signal 217, and the specified number of the second set of n-channel pre-gate drivers 246, selected or activated by the second control signal 219. In at least one embodiment, the low-side floating gate driver 224 includes a buffer that can buffer the enable signal 221.

In at least one embodiment, the specific number of p-channel pre-gate drivers 214 and the specific number of p-channel pre-gate drivers 234 are the same. In other embodiments, the specific number of p-channel pre-gate drivers 214 and the specific number of p-channel pre-gate drivers 234 are different. That is, the control logic 220 can independently control each set of pre-gate drivers of the high-side floating gate driver 222 and the low-side floating gate driver 224 to set the driver strength for different power applications.

In at least one embodiment, the programmable floating gate driver 200 is coupled to drive the first high-side switch and the first low-side switch according to a first drive strength parameter associated with the output voltage 201. In at least one embodiment, the programmable floating gate driver 200 is coupled to drive the second high-side switch and the second low-side switch according to a first drive strength parameter associated with the output voltage. In at least one embodiment, the programmable floating gate driver 200 is used for a first side of the buck-boost converter, and an identical floating gate driver can be used for a second side of the buck-boost converter. In one embodiment, the programmable floating gate driver 200 is coupled to a first input and a second input of a DC-to-DC converter. In a further embodiment, an identical programmable floating gate driver is coupled to a second input and a fourth input of the DC-to-DC converter.

In at least one embodiment, the ADC 206 generates a first digital value representing the output voltage 201, and the control logic 220 determines a first drive strength parameter of the programmable floating gate driver 200. In this embodiment, the first drive strength parameter is associated with a first number of p-channel pre-gate drivers 214, a second number of n-channel pre-gate drivers 226, a third number of p-channel pre-gate drivers 234, and a fourth number of n-channel pre-gate drivers 246. In a further embodiment, during operation of the DC-to-DC converter (e.g., dynamically), the ADC 206 measures a second output voltage 201, and the ADC 206 generates a second digital value representing a second output voltage of the buck-boost converter. The control logic 220 determines a second drive strength parameter of the programmable floating gate driver 200 based on the second output voltage. The second drive strength parameter is associated with a fifth number of p-channel pre-gate drivers 214, a sixth number of n-channel pre-gate drivers 226, a seventh number of p-channel pre-gate drivers 234, and an eighth number of n-channel pre-gate drivers 246.

The programmable floating gate driver 200 includes a look-up table (LUT) that associates output voltages and drive strength parameters in at least one embodiment. In at least one embodiment, the ADC 206 generates a first digital value representing the output voltage 201 of a DC-to-DC converter. Using the first digital value, the control logic 220 performs a lookup operation in the LUT to determine a first drive strength parameter of the programmable floating gate driver 200. Each of the drive strength parameters can specify the number of each set of pre-gate drivers that should be activated to set the drive strength of the programmable floating gate driver 200. The first and second numbers are associated with the first drive strength parameter. Similarly, different numbers of pre-gate drivers can be activated for a second drive strength parameter.

In a further embodiment, the ADC 206 generates a second digital value representing a second output voltage of the DC-to-DC converter. Using the second digital value, the control logic 220 performs a second lookup operation in the LUT to determine a second drive strength parameter of the programmable floating gate driver 200 based on the second output voltage. The second drive strength parameter is associated with a third number of the p-channel pre-gate drivers to activate and a fourth number of the n-channel pre-gate drivers to activate based on the second output voltage.

In at least one embodiment, the DC-to-DC converter is a buck-boost converter comprising a first high-side switch, a second high-side switch, a first low-side switch, and a second low-side switch. In another embodiment, the DC-to-DC converter is a buck converter, a boost converter, or other types of power converters. The programmable floating gate driver 200 is part of a USB-C controller in one embodiment. The programmable floating gate driver 200 is part of a multi-port controller in another embodiment. In this embodiment, multiple programmable floating gate drivers 200 can be used to control a second DC-to-DC converter.

Figure 5A:
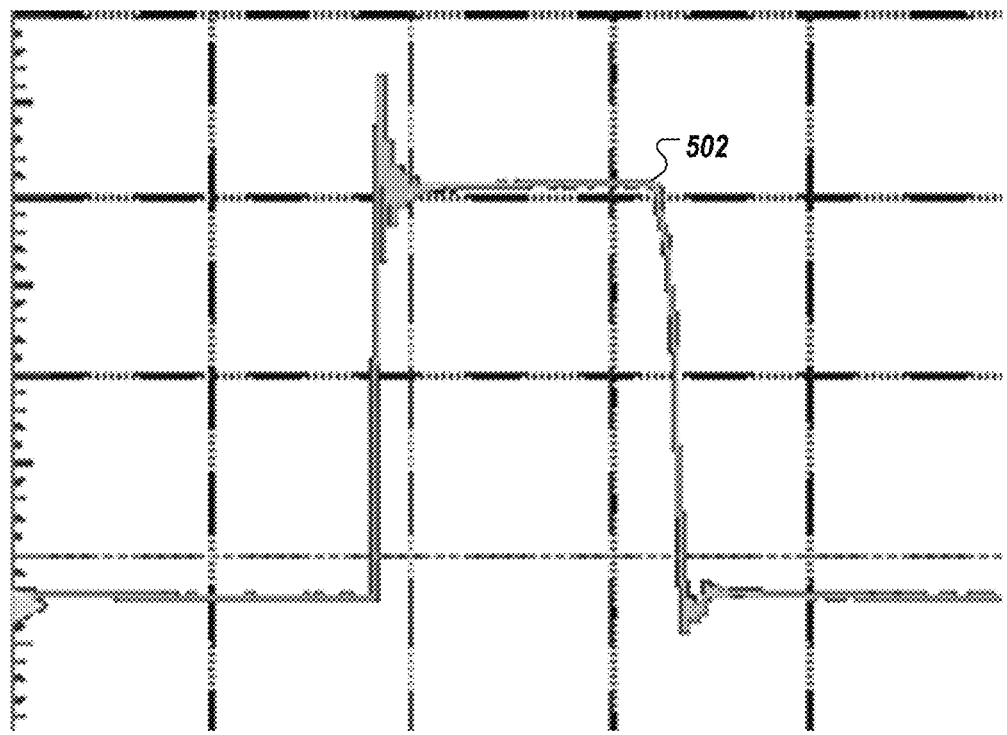
FIG. 5A is a signal diagram illustrating a first voltage signal with programmable floating gate drivers programmed to a first resistance according to at least one embodiment.
Figure 5B:
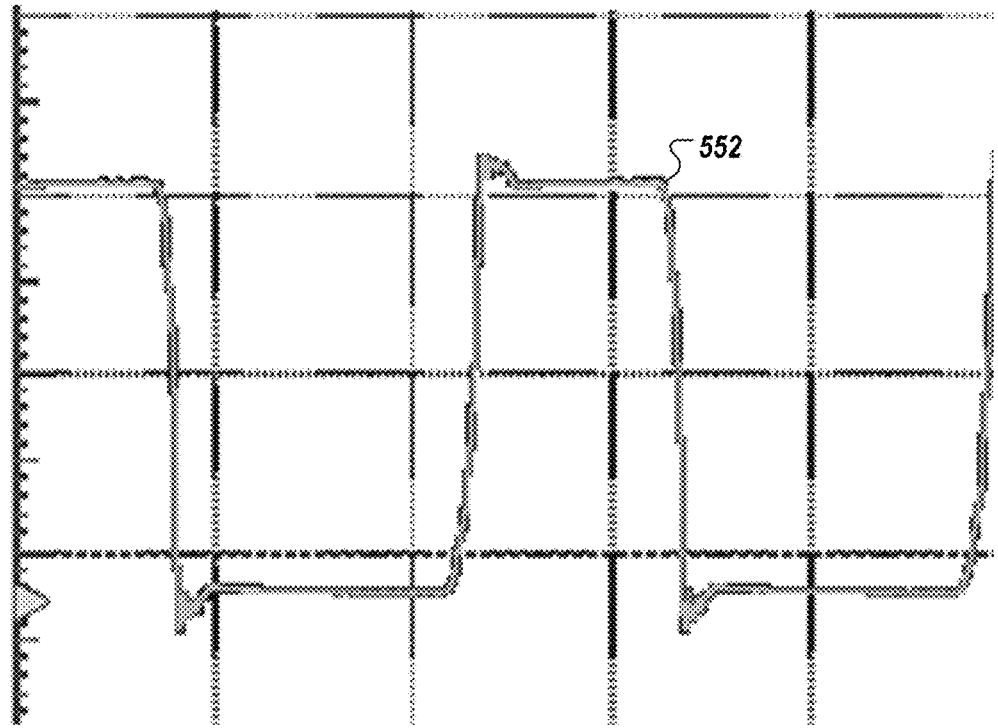
FIG. 5B is a signal diagram illustrating a first voltage signal with programmable floating gate drivers programmed to a second resistance according to at least one embodiment.
Figure 6A:
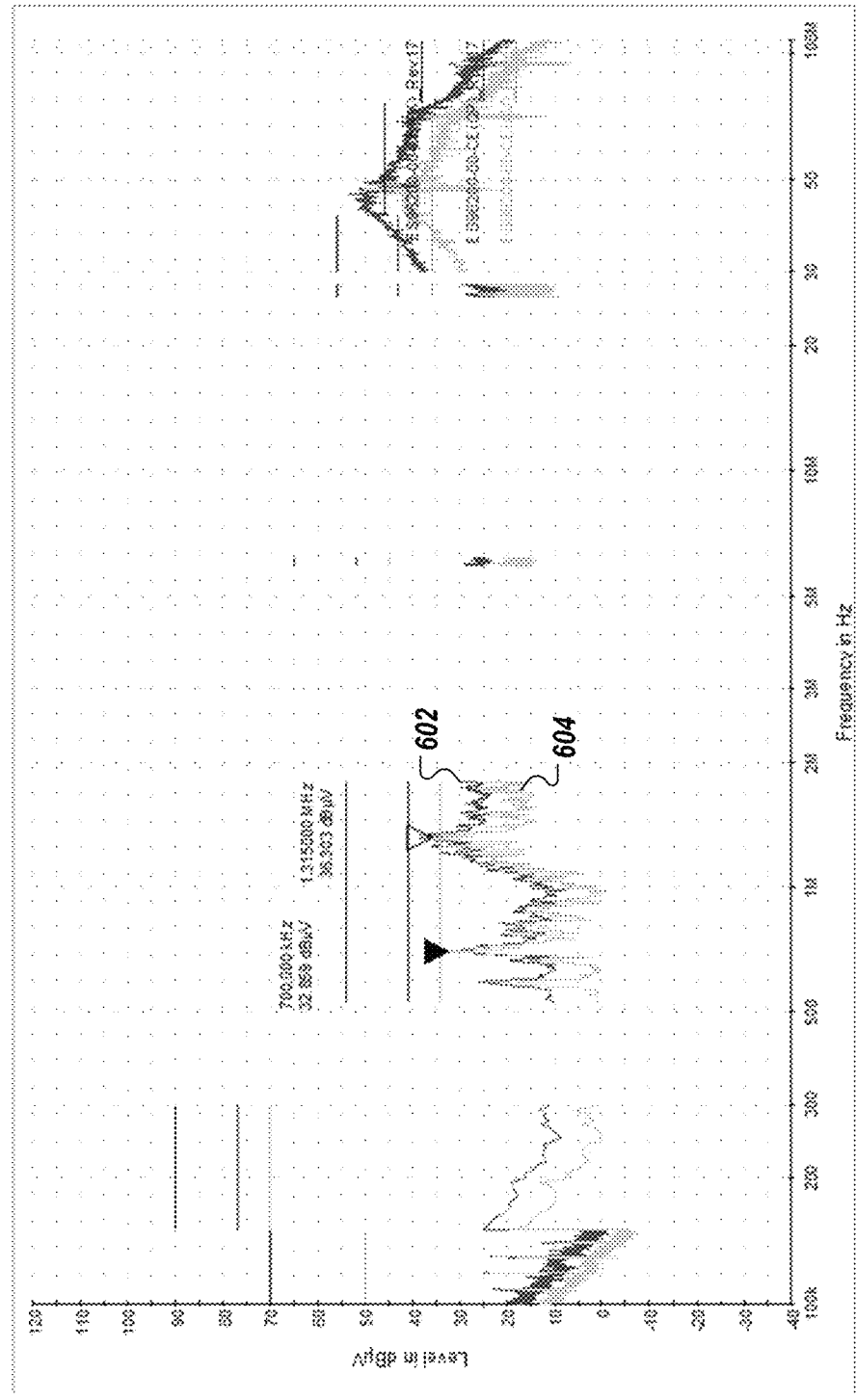
FIG. 6A is a graph showing an emission scan on each port with programmable floating gate drivers programmed to a first resistance according to at least one embodiment.
Figure 6B:
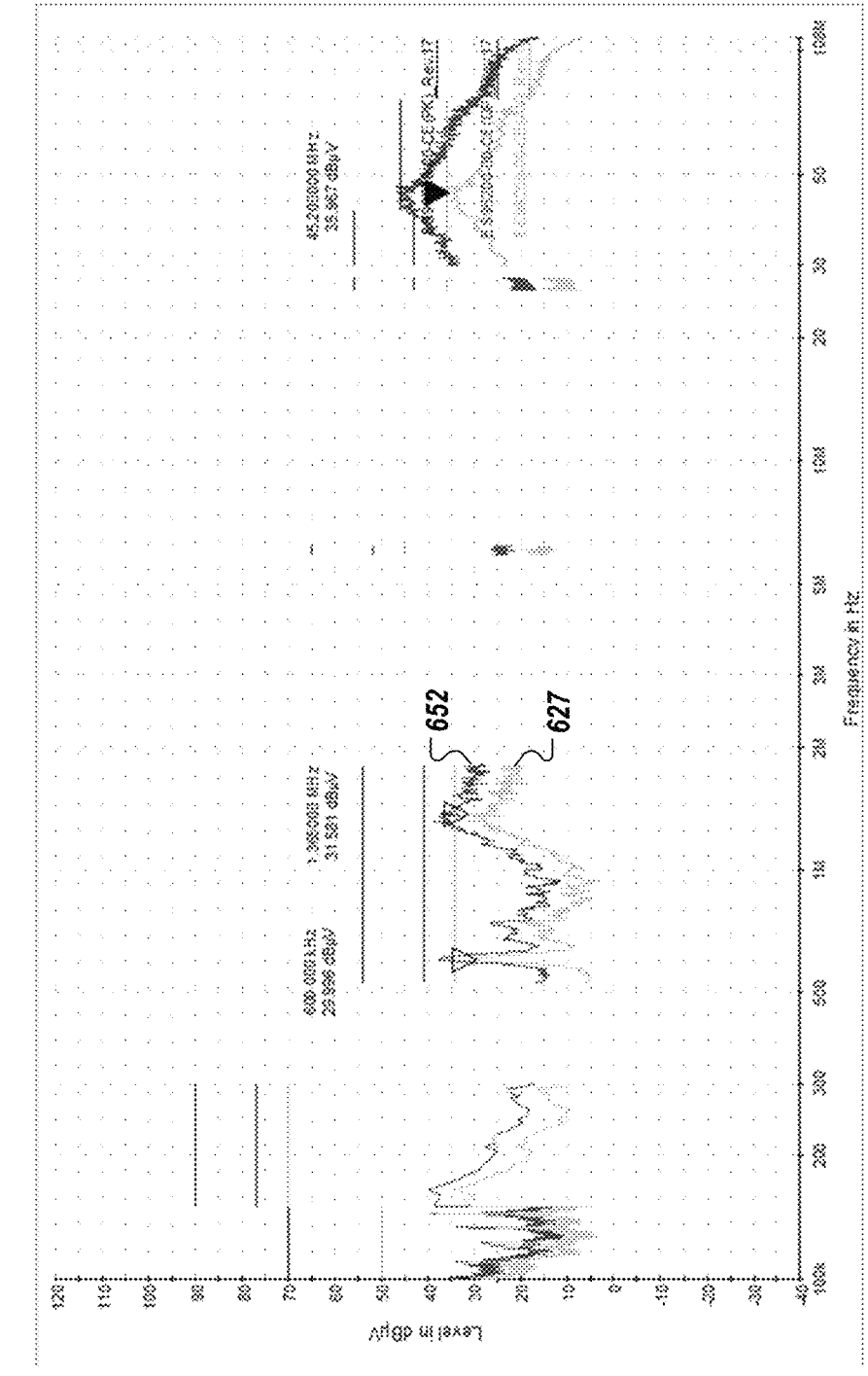
FIG. 6B is a graph showing an emission scan on each port with programmable floating gate drivers programmed to a second resistance according to at least one embodiment.

As described above, the programmable floating gate driver 200 can be programmed to different drive strengths, such as between 1 ohm to 30 ohms. The following description and FIGS. 5A and 6A illustrate when the programmable floating gate driver 200 is programmed to a pull-up resistance of 3.3 ohms (Rpu=3.3 ohms) and a pull-down resistance of 3.3 ohms (Rpd=3.3 ohms). FIGS. 5B and 6B illustrate when the programmable floating gate driver 200 is programmed to a pull-up resistance of 20 ohms (Rpu=20 ohms) and a pull-down resistance of 20 ohms (Rpd=20 ohms).

Figure 3:
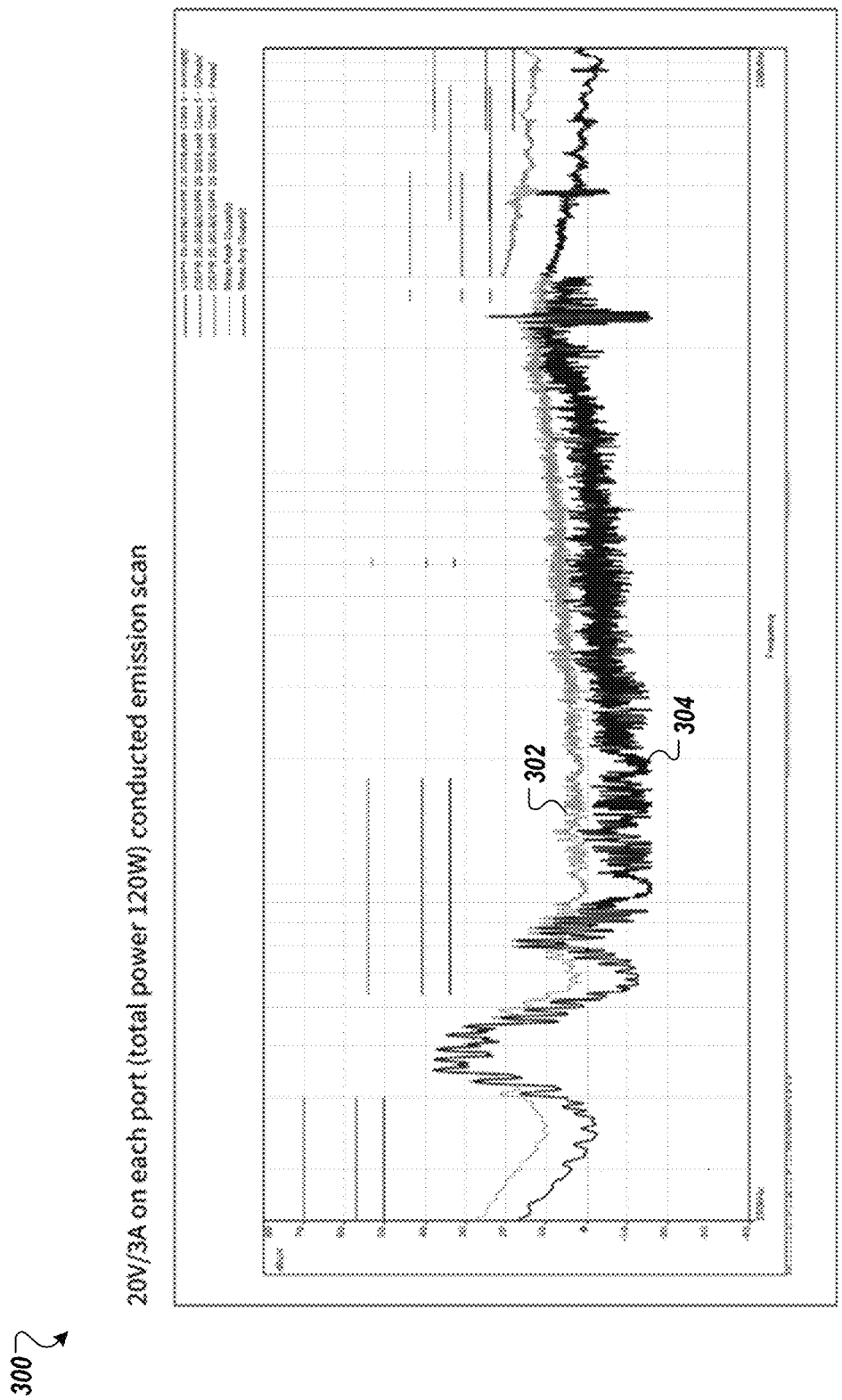
FIG. 3 is a graph showing an emission scan on each port of a USB Type-C controller with programmable floating gate drivers according to at least one embodiment.

FIG. 3 is a graph 300 showing an emission scan on each port of a USB Type-C controller with programmable floating gate drivers according to at least one embodiment. Graph 300 shows conducted emissions where an input voltage is 12 volts, and the output voltage (vbus_c) is 20 volts and 3 amps on each port with a total power of 120 Watts. The emission scan on each port shows a measured peak voltage 302 and a measured average 304 over a frequency range between 150 kHz to 108 MHZ.

FIG. 4 is a table 400 of output voltage and peak efficiency of a buck-boost converter controlled by programmable floating gate drivers according to at least one embodiment. Table 400 includes multiple output voltage levels and corresponding peak efficiencies. For example, at 5V, the buck-boost converter with the programmable floating gate drivers operates at a peak efficiency of 92.28%. At 9V, the buck-boost converter with the programmable floating gate drivers operates at a peak efficiency of 95.48%. At 15V, the buck-boost converter with the programmable floating gate drivers operates at a peak efficiency of 96.40%. At 20V, the buck-boost converter with the programmable floating gate drivers operates at a peak efficiency of 95.82%.

FIG. 5A is a signal diagram 500 illustrating a first voltage signal 502 with programmable floating gate drivers programmed to a first resistance according to at least one embodiment. In this embodiment, the programmable floating gate drivers are programmed to a pull-up resistance (Rpu) of 3.3 ohms and a pull-down resistance (Rpd) of 3.3 ohms for a 54 W power application.

FIG. 5B is a signal diagram 550 illustrating a first voltage signal 552 with programmable floating gate drivers programmed to a second resistance according to at least one embodiment. In this embodiment, the programmable floating gate drivers are programmed to a pull-up resistance (Rpu) of 20 ohms and a pull-down resistance (Rpd) of 20 ohms for a 54 W power application.

As illustrated in FIGS. 5A-5B, the different pull-up resistances and the pull-down resistances can improve the signal, especially at the rising and falling edges of the signal.

FIG. 6A is a graph 600 showing an emission scan on each port with programmable floating gate drivers programmed to a first resistance according to at least one embodiment. In this embodiment, the programmable floating gate drivers are programmed to a pull-up resistance (Rpu) of 3.3 ohms and a pull-down resistance (Rpd) of 3.3 ohms for a 27 W power application. Graph 600 shows conducted emissions where an input voltage is 12 volts, and the output voltage (vbus_c) is 9 volts and 3 amps on each port with a total power of 27 Watts. The emission scan on each port shows a measured peak voltage 602 and a measured average 604 over a frequency range between 100 kHz to 108 MHz.

FIG. 6B is a graph 650 showing an emission scan on each port with programmable floating gate drivers programmed to a second resistance according to at least one embodiment. In this embodiment, the programmable floating gate drivers are programmed to a pull-up resistance (Rpu) of 20 ohms and a pull-down resistance (Rpd) of 20 ohms for a 27 W power application. Graph 650 shows conducted emissions where an input voltage is 12 volts, and the output voltage (vbus_c)

is 9 volts and 3 amps on each port with a total power of 27 Watts. The emission scan on each port shows a measured peak voltage 652 and a measured average 654 over a frequency range between 100 kHz to 108 MHz.

As illustrated in FIGS. 6A-6B, the different pull-up resistances and the pull-down resistances can reduce emissions to help comply with EMI/EMC requirements.

Figure 7:
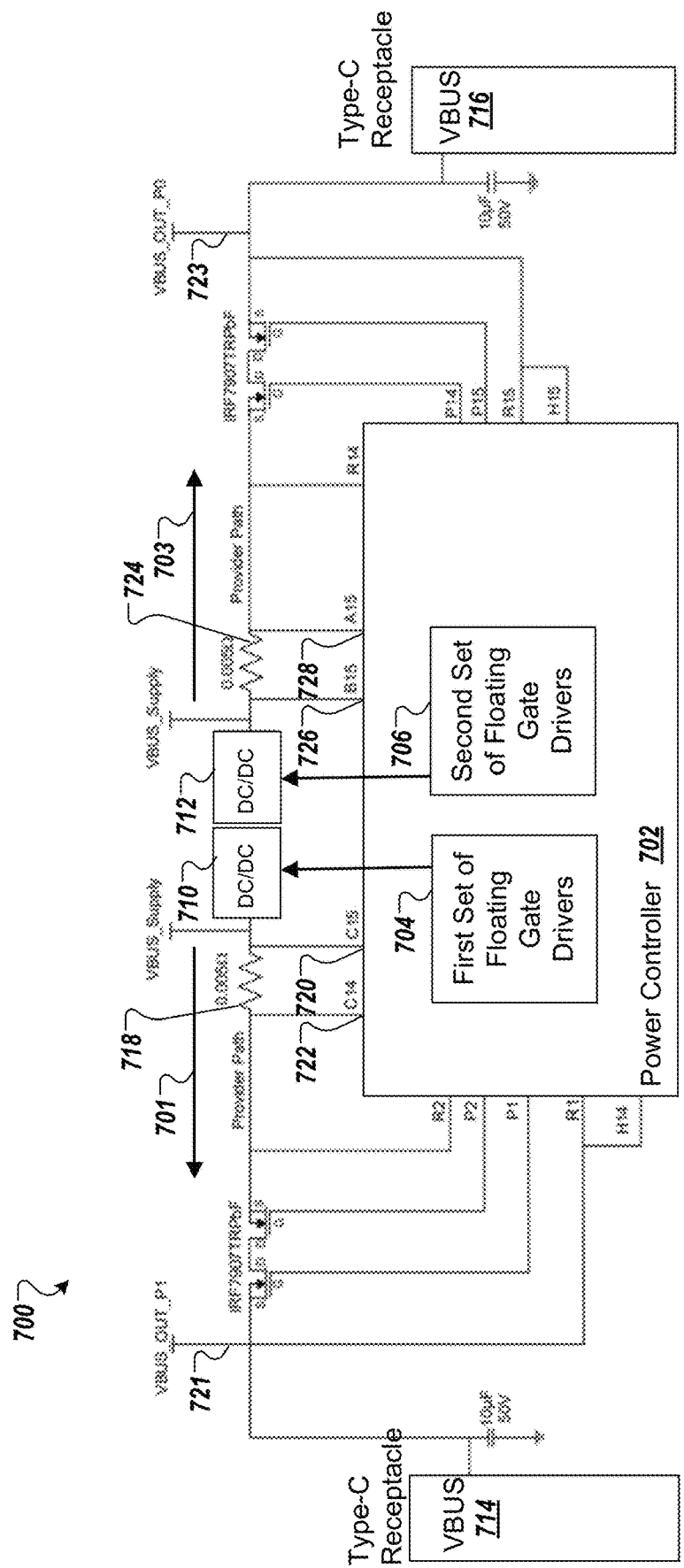
FIG. 7 is a block diagram of a two-port charger system with a power controller with programmable floating gate drivers according to at least one embodiment.

FIG. 7 is a block diagram of a two-port charger system 700 with a power controller 702 with programmable floating gate drivers 704, 706 according to at least one embodiment. The two-port charger system 700 includes two power converters 710, 712 to supply power to USB Type-C receptacles 714, 716, respectively. The power controller 702 uses a first set of floating gate drivers 704 to set a drive strength for driving the first power converter 710 that provides a first supply current 701. The power controller 702 uses a second set of floating gate drivers 706 to set a drive strength for driving the second power converter 712 that provides a second supply current 703. The power controller 702 can measure the first supply current 701 using a first resistor 718 coupled between two terminals 720, 722. The power controller 702 can measure the first supply current 701 as a differential voltage signal at the two terminals 720, 722. The power controller 702 can measure the second supply current 703 using a second resistor 724 coupled between two terminals 726, 728. The power controller 702 can measure the second supply current 703 as a differential voltage signal at the two terminals 726, 728. The differential voltage signal can be input into the power controller 702. The power controller 702 can measure a first output voltage 721 (VBUS_OUT_P1) of the first power converter 710 and a second output voltage 723 of the second power converter 712 (VBUS_OUT_P0).

In the illustrated embodiment, the first set of floating gate drivers 704 can include one or more of the programmable floating gate drivers 200 of FIG. 2. The second set of floating gate drivers 706 can include one or more of the programmable floating gate driver 200 of FIG. 2.

In another embodiment, the power controller 702 is a dual-port USB Type-C controller in the two-port charger system 700. In other embodiments, the power controller 702 is part of a USB-PD subsystem used in various applications. In at least one embodiment, the power controller 702 can be used in, or in connection with, a vehicle entertainment system. In at least one embodiment, the power controller 702 includes a connector that connects to other subsystems of the vehicle entertainment system. Alternatively, the connector can connect to other systems, such as a head-unit charger, a rear-seat charger, a charger of an entertainment system, or the like.

The power controller 702 can also support other types of USB receptacles and power converters in other embodiments. Although the power controller 702 is illustrated for two ports, the power controller 702 can support one port or more than two ports.

In at least one embodiment, the power controller 702 may be disposed in a chip package and includes a USB-PD subsystem configured in accordance with the floating gate architectures described herein. The power controller 702 is configured to negotiate a PD contract with a consumer device (not shown) attached to the USB Type-C receptacle 714 and control through an output terminal the required VBUS voltage. USB Type-C receptacle 714 is can also be referred to as a USB Type-C connector and is typically associated with a Type-C plug, but it should be understood that in various embodiments, the USB Type-C receptacle 714 may be associated with a Type-C port instead. The power controller 702 is configured to negotiate a PD control with other consumer devices attached to other USB Type-C receptacles, including a $1^{st}$ through $N^{th}$ USB Type-C receptacle.

In at least one embodiment, the power controller 702 operates in a voltage range between approximately 1.2V to approximately 5V. In contrast, the power converters 710, 712 can operate in a voltage range between approximately 3.3V to approximately 30V.

In at least one embodiment, the power controller 702 is coupled to a power and switch components. The power and switch components can include a four-switch buck-boost DC-to-DC converter. The switches can be external NFETs.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, the SBPD device is a multi-port USB-PD device compatible with the USB-PD standard or, more generally, with the USB standard. For example, the SBPD device may provide an output voltage (e.g., VBUS_C, power supply voltage) based on an input voltage (e.g., VBUS_IN, power supply voltage) on each of the multiple ports. The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier.

In embodiments, the SBPD device is connected to a power source, such as a wall socket power source that provides AC power. In other embodiments, the power source may be a different power source, such as a vehicle battery, and may provide DC power to the SBPD device. The power converter may convert the power received from a power source (e.g., convert power received to VBUS_IN, ranging from 3.3V to 21.5V). For example, a power converter may be an AC-DC converter and convert AC power from the power source to DC power. In some embodiments, the power converter is a flyback converter, such as a secondary-controlled flyback converter, that provides galvanic isolation between the input (e.g., primary side) and the output (e.g., secondary side). In another embodiment, the device may be a consumer device receiving power from the SBPD device. The consumer device may control the gate-source voltage of its provider FET with a secondary gate driver(s) integrated onto the secondary-side controller of the consumer device.

In some embodiments, the SBPD device provides VBUS_C to a sink device (e.g., via a Configuration Channel (CC) specifying a particular output voltage and possibly an output current). SBPD device may also provide access to ground potential (e.g., ground) to the sink device. In some embodiments, the providing of the VBUS_C is compatible with the USB-PD standard. The power control analog subsystem may receive VBUS_IN from the power converter, and the power control analog subsystem may output VBUS_IN. The power control analog subsystem is a USB Type-C controller compatible with the USB Type-C standard in some embodiments. The power control analog subsystem may provide system interrupts responsive to the VBUS_IN and the VBUS_C.

In some embodiments, any of the components of the SBPD device may be part of an IC, or alternatively, any of the components of the SBPD device may be implemented in its own IC. For example, the power converter and the power control analog subsystem may be discrete ICs with separate packaging and terminal configurations.

In some embodiments, the SBPD device may provide a complete USB Type-C and USB-Power Delivery port control solution for notebooks, dongles, monitors, docking stations, power adapters, vehicle chargers, power banks, mobile adaptors, and the like.

Figure 8:
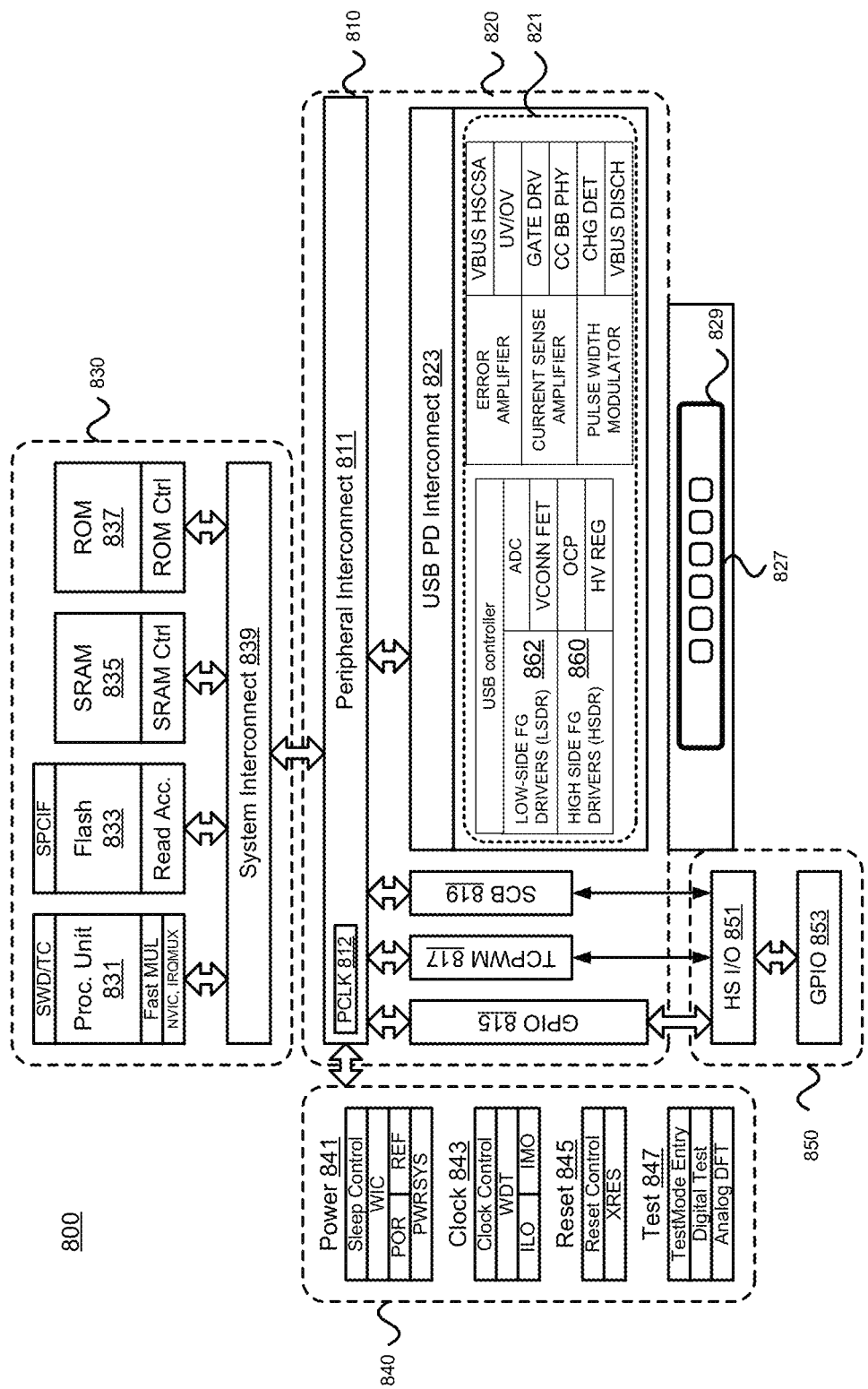
FIG. 8 is a block diagram illustrating an integrated circuit (IC) system for a USB device with programmable floating gate drivers with programmable drive strengths in USB power delivery in accordance with some embodiments.

FIG. 8 is a block diagram illustrating an integrated circuit (IC) system 800 for a USB device with programmable floating gate drivers with programmable drive strengths in USB power delivery in accordance with some embodiments. System 800 may include a peripheral subsystem 810, including a number of components for use in USB-PD. Peripheral subsystem 810 may include a peripheral interconnect 811 including a clocking module, peripheral clock (PCLK) 812 for providing clock signals to the various components of peripheral subsystem 810. Peripheral interconnect 811 may be a peripheral bus, such as a single-level or multi-level advanced high-performance bus (AHB), and may provide a data and control interface between peripheral subsystem 810, central processing unit (CPU) subsystem 830, and system resources 840. Peripheral interconnect 811 may include controller circuits, such as direct memory access (DMA) controllers, which may be programmed to transfer data between peripheral blocks without input by, control of, or burden on CPU subsystem 830.

The peripheral interconnect 811 may be used to couple components of peripheral subsystem 810 to other components of system 800. Coupled to peripheral interconnect 811 may be a number of general-purpose input/outputs (GPIOs) 815 for sending and receiving signals. GPIOs 815 may include circuits configured to implement various functions such as pull-up, pull-down, input threshold select, input, and output buffer enabling/disable, single multiplexing, etc. Still, other functions may be implemented by GPIOs 815. One or more timer/counter/pulse-width modulator (TCPWM) 817 may also be coupled to the peripheral interconnect and include circuitry for implementing timing circuits (timers), counters, pulse-width modulators (PWMs) decoders, and other digital functions that may operate on I/O signals and provide digital signals to system components of system 800. Peripheral subsystem 810 may also include one or more serial communication blocks (SCBs) 819 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 810 may include a USB power delivery subsystem 820 coupled to the peripheral interconnect and comprising a set of USB-PD modules 821 for use in USB power delivery. USB-PD modules 821 may be coupled to the peripheral interconnect 811 through a USB-PD interconnect 823. USB-PD modules 821 may include an analog-to-digital conversion (ADC) module for converting various analog signals to digital signals; an error amplifier (AMP) for regulating the output voltage on VBUS line per a PD contract; a high-voltage (HV) regulator for converting the power source voltage to a precise voltage (such as 3.5-5V) to power system 800; an over-voltage protection (OVP) module for providing over-voltage protection on the VBUS line with configurable thresholds and response times; one or more gate drivers for external power field-effect transistors (FETs) used in USB power delivery in provider and consumer configurations; a communication channel physical layer (CC BB PHY) module for supporting communications on a Type-C communication channel (CC) line; and high-side floating gate drivers 860. The high-side floating gate drivers 860 can include an over-current protection (OCP) module, a short-current protection (SCP) module, and a reverse-current protection (RCP) module for detecting fault conditions as described herein. USB-PD modules 821 may also include a charger detection module for determining that a charging circuit is present and coupled to system 800 and a VBUS discharge module for controlling the voltage discharge on VBUS. USB power delivery subsystem 820 may also include pads 827 for external connections and electrostatic discharge (ESD) protection circuitry 829, which may be required on a Type-C port. USB-PD modules 821 may also include a communication module for retrieving and communicating information stored in non-volatile memory controller with another controller, such as between a primary-side controller and a secondary-side controller of a flyback converter. USB-PD modules 821 may also include one or more modules with programmable floating gate driver circuits for programmable drive strengths as described herein.

GPIO 815, TCPWM 817, and SCB 819 may be coupled to an input/output (I/O) subsystem 850, which may include a high-speed (HS) I/O matrix 851 coupled to a number of GPIOs 853. GPIOs 815, TCPWM 817, and SCB 819 may be coupled to GPIOs 853 through HS I/O matrix 851.

System 800 may also include the CPU subsystem 830 for processing commands, storing program information, and data. CPU subsystem 830 may include one or more processing units 831 for executing instructions and reading from and writing to memory locations from a number of memories. Processing unit 831 may be a processor suitable for operation in an integrated circuit (IC) or a system-on-chip (SOC) device. In some embodiments, processing unit 831 may be optimized for low-power operation with extensive clock gating. In this embodiment, various internal control circuits may be implemented for processing unit operation in various power states. For example, processing unit 831 may include a wake-up interrupt controller (WIC) configured to wake the processing unit up from a sleep state, allowing power to be switched off when the IC or SOC is in a sleep state. CPU subsystem 830 may include one or more memories, including a flash memory 833, static random access memory (SRAM) 835, and a read-only memory (ROM) 837. Flash memory 833 may be a non-volatile memory (NAND flash, NOR flash, etc.) configured for storing data, programs, and/or other firmware instructions. Flash memory 833 may include a read accelerator and may improve access times by integration within CPU subsystem 830. SRAM 835 may be a volatile memory configured for storing data and firmware instructions accessible by processing unit 831. ROM 837 may be configured to store boot-up routines, configuration parameters, and other firmware parameters and settings that do not change during the operation of system 800. SRAM 835 and ROM 837 may have associated control circuits. Processing unit 831 and the memories may be coupled to a system interconnect 839 to route signals to and from the various components of CPU subsystem 830 to other blocks or modules of system 800. System interconnect 839 may be implemented as a system bus such as a single-level or multi-level AHB. System interconnect 839 may be configured as an interface to couple the various components of CPU subsystem 830 to each other. System interconnect 839 may be coupled to peripheral interconnect 811 to provide signal paths between the components of CPU subsystem 830 and peripheral subsystem 810.

System 800 may also include a number of system resources 840, including a power module 841, a clock module 843, a reset module 845, and a test module 847. Power module 841 may include a sleep control module, a wake-up interrupt control (WIC) module, a power-on-reset (POR) module, a number of voltage references (REF), and a PWRSYS module. In some embodiments, power module 841 may include circuits that allow system 800 to draw and/or provide power from/to external sources at different voltage and/or current levels and support controller operation in different power states, such as an active state, a low-power state, or one or more sleep states. In various embodiments, more power states may be implemented as system 800 throttles back operation to achieve a desired power consumption or output. Clock module 843 may include a clock control module, a watchdog timer (WDT), an internal low-speed oscillator (ILO), and an internal main oscillator (IMO). Reset module 845 may include a reset control module and an external reset (XRES) module. Test module 847 may include a module to control and enter a test mode as well as testing control modules for analog and digital functions (digital test and analog DFT).

System 800 may be an IC implemented in a monolithic (e.g., single) semiconductor die, such as a Programmable System on Chip (PSoC) for example. In other embodiments, various portions or modules of system 800 may in implemented on different semiconductor dies. For example, memory modules of CPU subsystem 830 may be on-chip or separate. In still other embodiments, some separate-die circuits may be packaged into a single "chip," while other circuits may be implemented as external components disposed on a circuit board (or in a USB connector) as separate elements.

System 800 may be implemented in a number of application contexts to provide USB-PD functionality thereto. In each application context, an IC controller or SOC implementing system 800 may be disposed and configured in an electronic device (e.g., a USB-enabled device) to perform operations in accordance with the techniques described herein. In one example embodiment, a system 800 may be disposed and configured in a personal computer (PC) power adapter for a laptop, a notebook computer, etc. In another example embodiment, system 800 may be disposed and configured in a power adapter (e.g., a wall charger) for a mobile electronic device (e.g., a smartphone, a tablet, etc.). In another example embodiment, system 800 may be disposed and configured in a wall socket that is configured to provide power over USB Type-A and/or Type-C port(s). In another example embodiment, system 800 may be disposed and configured in a car charger that is configured to provide power over USB Type-A and/or Type-C port(s). In yet another example embodiment, system 800 may be disposed and configured in a power bank that can get charged and then provide power to another electronic device over a USB Type-A or Type-C port. In other embodiments, a system like system 800 may be configured with the programmable floating gate drivers with programmable drive strengths described herein and may be disposed in various other USB-enabled electronic or electro-mechanical devices.

It should be understood that a system, like system 800 implemented on or as an IC controller, may be disposed into different applications, which may differ with respect to the type of power source being used and the direction in which power is being delivered. For example, in the case of a car charger, the power source is a car battery that provides DC power, while in the case of a mobile power adapter, the power source is an AC wall socket. Further, in a PC power adapter, the flow of power delivery is from a provider device to a consumer device. In contrast, in the case of a power bank, the flow of power delivery may be in both directions depending on whether the power bank operates as a power provider (e.g., to power another device) or as a power consumer (e.g., to get charged itself). For these reasons, the various applications of system 800 should be regarded in an illustrative rather than a restrictive sense.

Figure 9:
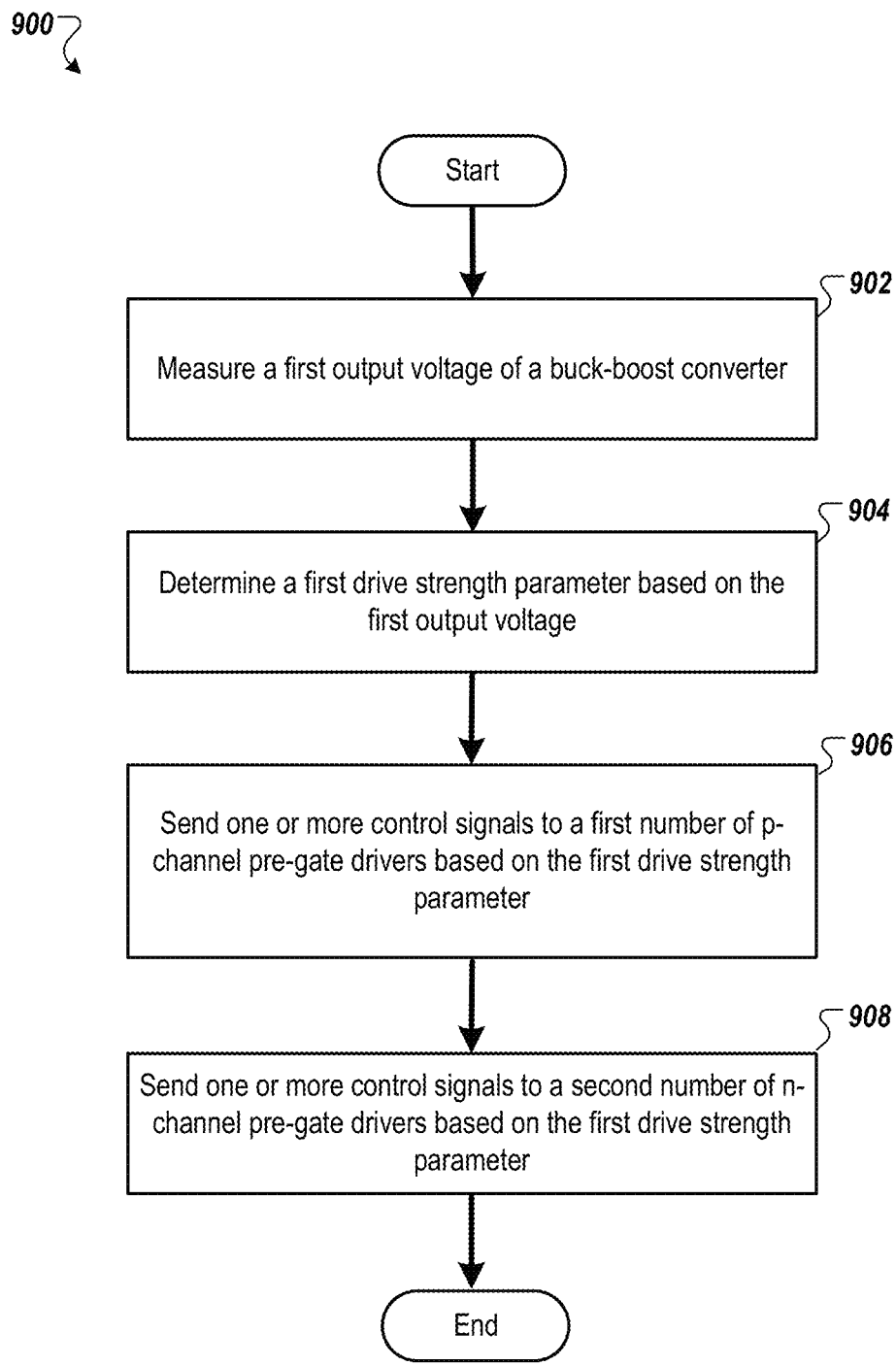
FIG. 9 is a flow diagram of a method of driving a buck-boost converter with a programmable floating gate driver for a USB-PD power device, according to at least one embodiment.

FIG. 9 is a flow diagram of a method 900 of driving a buck-boost converter with a programmable floating gate driver for a USB-PD power device, according to at least one embodiment. The method 900 may be performed by processing logic that comprises hardware (e.g., circuitry, dedicated logic, programmable logic, microcode, etc.), firmware, or a combination thereof. In one embodiment, the method 900 may be performed by any of the processing devices described herein. In one embodiment, the method 900 is performed by the USB-C controller 100 of FIG. 1A. In one embodiment, the method 900 is performed by the BB control logic 120 of FIG. 1A or the BB control logic 150 of FIG. 1B. In another embodiment, the method 900 is performed by the control logic 220 of a programmable floating gate driver of FIG. 2. In another embodiment, the method 900 is performed by the power controller 702 of FIG. 7. In another embodiment, the method 900 is performed by the USB power delivery subsystem 820 of FIG. 8. In one embodiment, the processing logic executes a firmware-based method that performs the following operations. In another embodiment, the processing logic has embedded code or logic and is configured to execute instructions to perform the following operations.

Referring to FIG. 9, the method 900 begins by the processing logic measuring a first output voltage of the buck-boost converter (block 902). The processing logic determines a first drive strength parameter based on the first output voltage (block 904). The processing logic sends one or more control signals to a first number of p-channel pre-gate drivers, each of the p-channel pre-gate drivers coupled to one of a set of p-channel FETs coupled in parallel between a first terminal and a second terminal of the USB-C controller (block 906). The processing logic sends one or more control signals to a second number of n-channel pre-gate drivers, each of the n-channel pre-gate drivers coupled to one of a set of n-channel FETs coupled in parallel between the second terminal and a third terminal of the USB-C controller (block 908), and the method 900 ends. The first and second numbers are associated with the first drive strength parameter.

In a further embodiment, the processing logic sends one or more control signals to a third number of a second set of p-channel pre-gate drivers, each of the second set of p-channel pre-gate drivers coupled to one of a second set of p-channel FETs coupled in parallel between a fourth terminal and a fifth terminal of the USB-C controller. The processing logic sends one or more control signals to a fourth number of a second set of n-channel pre-gate drivers, each of the second set of n-channel pre-gate drivers coupled to one of a second set of n-channel FETs coupled in parallel between the fifth terminal and a sixth terminal of the USB-C controller.

In another embodiment, the processing logic generates a first digital value of the first output voltage and performs a first lookup operation, using the first digital value, to determine the first drive strength parameter. In a further embodiment, during operation (e.g., dynamically) the processing logic measures a second output voltage of the buck-boost converter. The processing logic generates a second digital value of the second output voltage and, using the second digital value, performs a second lookup operation to determine a second drive strength parameter. The processing logic sends one or more control signals to a third number of the set of p-channel pre-gate drivers. The processing logic sends one or more control signals to a fourth number of the set of n-channel pre-gate drivers. The third and fourth numbers are associated with the first drive strength parameter.

In other embodiments, the method 900 can be performed in connection with different types of power converters than the buck-boost converter, as described herein. The method 900 can be performed in a multi-port USB-C controller in other embodiments.

Figure 10:
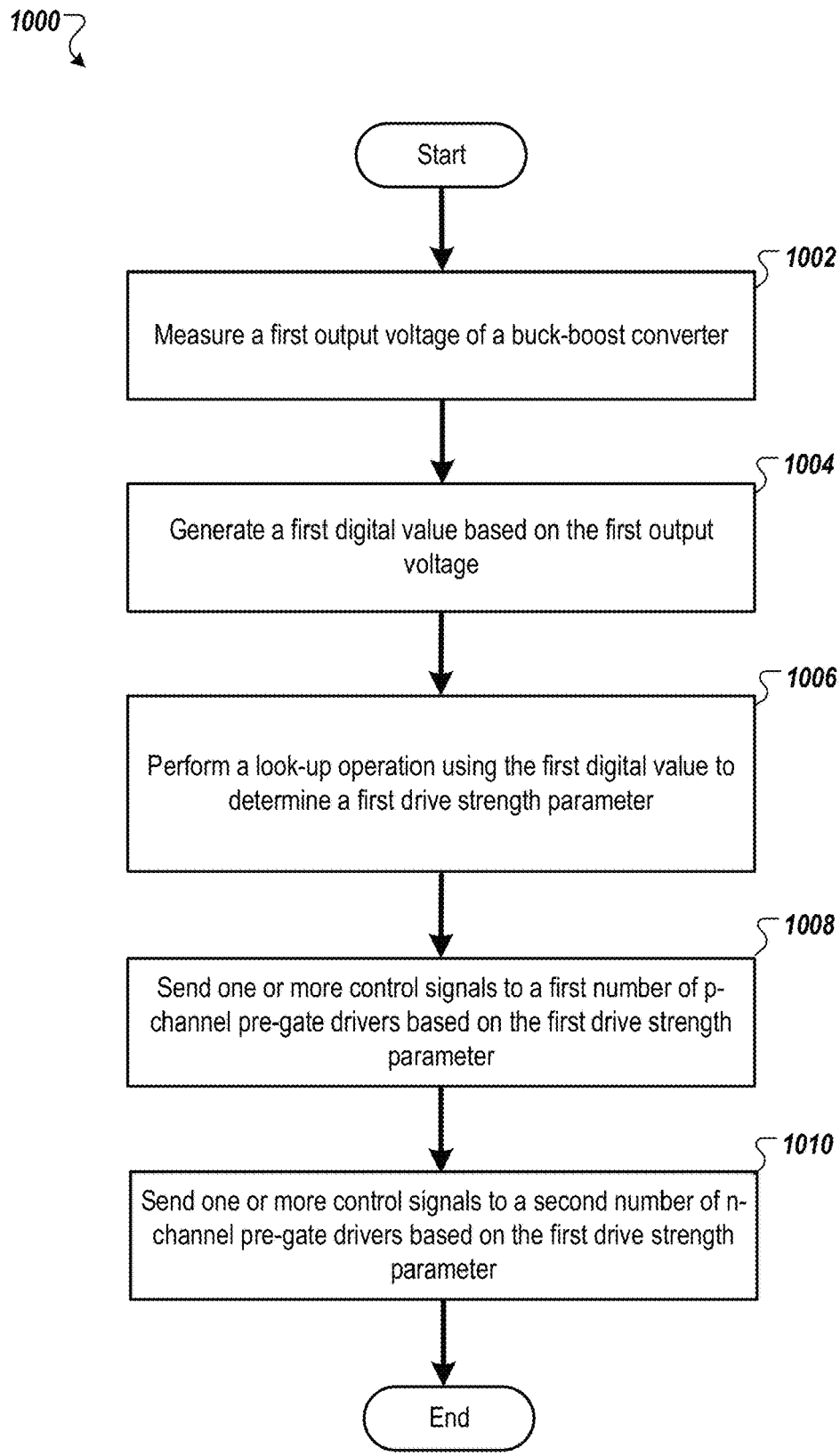
FIG. 10 is a flow diagram of a method of driving a buck-boost converter with a programmable floating gate driver for a USB-PD power device, according to at least one embodiment.

FIG. 10 is a flow diagram of a method 1000 of driving a buck-boost converter with a programmable floating gate driver for a USB-PD power device, according to at least one embodiment. The method 1000 may be performed by processing logic that comprises hardware (e.g., circuitry, dedicated logic, programmable logic, microcode, etc.), firmware, or a combination thereof. In one embodiment, the method 1000 may be performed by any of the processing devices described herein. The method 1000 is performed by the USB-C controller 100 of FIG. in one embodiment. 1A. In one embodiment, the method 1000 is performed by the BB control logic 120 of FIG. 1A or the BB control logic 150 of FIG. 1B. In another embodiment, the method 1000 is performed by the control logic 220 of a programmable floating gate driver of FIG. 2. In another embodiment, the method 1000 is performed by the power controller 702 of FIG. 7. In another embodiment, the method 1000 is performed by the USB power delivery subsystem 820 of FIG. 8. In one embodiment, the processing logic executes a firmware-based method that performs the following operations. In another embodiment, the processing logic has embedded code or logic and is configured to execute instructions to perform the following operations.

Referring to FIG. 10, the method 1000 begins by the processing logic measuring a first output voltage of the buck-boost converter (block 1002). The processing logic generates a first digital value based on the first output voltage (block 1004). The processing logic performs a lookup operation using the first digital value to determine a first drive strength parameter (block 1006). The processing logic sends one or more control signals to a first number of a set of p-channel pre-gate drivers, each of the set of p-channel pre-gate drivers coupled to one of a set of p-channel FETs coupled in parallel between a first terminal and a second terminal of the USB-C controller (block 1008). The processing logic sends one or more control signals to a second number of a set of n-channel pre-gate drivers, each of the set of n-channel pre-gate drivers coupled to one of a set of n-channel FETs coupled in parallel between the second terminal and a third terminal of the USB-C controller (block 1010), and the method 1000 ends. The first number and the second number are associated with the first drive strength parameter.

In a further embodiment, during operation (e.g., dynamically) the processing logic measures a second output voltage of the buck-boost converter and generates a second digital value based on the second output voltage. The processing logic performs a second lookup operation using the second digital value to determine a second drive strength parameter. The processing logic sends one or more control signals to a third number of the set of p-channel pre-gate drivers. The processing logic sends one or more control signals to a fourth number of the set of n-channel pre-gate drivers. The third number and the fourth number are associated with the second drive strength parameter.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "driving," "receiving," "controlling," "pulling down," "shorting," or the like, refer to the actions and processes of a IC system, or similar electronic computing device, that manipulates and transforms data represented as physical (e.g., electronic) quantities within the IC system's registers and memories into other data similarly represented as physical quantities within the IC system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." Unless specified otherwise or clear from context, "X includes A or B" is intended to mean any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise an IC selectively activated or reconfigured by firmware instructions stored in the IC. Such firmware instructions may be stored in a non-transitory computer-readable storage medium, such as, but not limited to, any type of memory, such as read-only memories (ROMs), random access memories (RAMs), EPROMS, EEPROMs, flash memory, or any type of media suitable for storing electronic instructions. The term "computer-readable storage medium" should be taken to include a single medium or multiple media that store one or more sets of instructions.

The term "computer-readable medium" shall also be taken to include any medium capable of storing, encoding, or carrying a set of instructions for execution by the machine or device, which causes the machine or device to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine or device and that causes the machine or device to perform any one or more of the methodologies of the present embodiments.

The above description sets forth numerous specific details, such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A Universal Serial Bus Type-C (USB-C) controller comprising:
    a first floating gate driver comprising:
    a plurality of p-channel field-effect transistors (FETs) coupled in parallel between a first terminal and a second terminal;
    a plurality of p-channel pre-gate drivers, each p-channel pre-gate driver being coupled to a different gate of one of the plurality of p-channel FETs;
    a plurality of n-channel FETs coupled in parallel between the second terminal and a third terminal; and
    a plurality of n-channel pre-gate drivers, each n-channel pre-gate driver being coupled to a different gate of one of the plurality of n-channel FETs;
    an analog-to-digital converter (ADC) to generate a first digital value representing an output voltage of a buck-boost converter coupled to the USB-C controller; and
    control logic coupled to the first floating gate driver, wherein the control logic is to send one or more control signals to activate a first number of the plurality of p-channel pre-gate drivers and a second number of the plurality of n-channel pre-gate drivers based on the first digital value, wherein the control logic is further to determine a first drive strength parameter of the first floating gate driver based on the output voltage, wherein the first number and the second number are associated with the first drive strength parameter.

2. The USB-C controller of claim 1, wherein the first floating gate driver is a high-side floating gate driver coupled to a high-side switch of the buck-boost converter.

3. The USB-C controller of claim 1, wherein the first floating gate driver is a high-side floating gate driver coupled to a low-side switch of the buck-boost converter.

4. The USB-C controller of claim 1, wherein the first floating gate driver further comprises:
    a second plurality of p-channel FETs coupled in parallel between a fourth terminal and a fifth terminal;
    a second plurality of p-channel pre-gate drivers, each p-channel pre-gate driver being coupled to a gate of one of the second plurality of p-channel FETs;
    a second plurality of n-channel FETs coupled in parallel between the fifth terminal and a sixth terminal; and
    a second plurality of n-channel pre-gate drivers, each n-channel pre-gate driver being coupled to a gate of one of the second plurality of n-channel FETs,
    wherein the control logic is further to send one or more second control signals to activate a third number of the second plurality of p-channel pre-gate drivers and a fourth number of the second plurality of n-channel pre-gate drivers based on the first digital value.

5. The USB-C controller of claim 4, further comprising a second floating gate driver that is identical to the first floating gate driver, wherein the first floating gate driver is coupled to a first input and a second input of the buck-boost converter, wherein the second floating gate driver is coupled to a third input and a fourth input of the buck-boost converter.

6. The USB-C controller of claim 4, wherein the first and third numbers are the same, wherein the second and fourth numbers are the same.

7. The USB-C controller of claim 1, wherein:
    the ADC to generate a second digital value representing a second output voltage of the buck-boost converter;
    the control logic is to determine a second drive strength parameter of the first floating gate driver based on the second output voltage, wherein the second drive strength parameter is associated with a third number of the plurality of p-channel pre-gate drivers to activate and a fourth number of the plurality of n-channel pre-gate drivers to activate; and
    the control logic is to send one or more control second signals to activate the third number of the plurality of p-channel pre-gate drivers and the fourth number of the plurality of n-channel pre-gate drivers based on the second output voltage.

8. A system comprising:
    a direct current-to-direct current (DC-to-DC) converter;
    a power controller coupled to the DC-to-DC converter, wherein the power controller comprises control logic and at least one floating gate driver comprising:
    a plurality of p-channel field-effect transistors (FETs) coupled in parallel between a first terminal and a second terminal, the first and second terminals being coupled to the DC-to-DC converter;
    a plurality of p-channel pre-gate drivers, each p-channel pre-gate driver being coupled to a different gate of one of the plurality of p-channel FETs;
    a plurality of n-channel FETs coupled in parallel between the second terminal and a third terminal, the second and third terminals being coupled to the DC-to-DC converter;
    a plurality of n-channel pre-gate drivers, each n-channel pre-gate driver being coupled to a different gate of one of the plurality of n-channel FETs; and
    an analog-to-digital converter (ADC) to generate a first digital value representing an output voltage of the DC-to-DC converter;
    wherein the control logic is to send one or more control signals to activate a first number of the plurality of p-channel pre-gate drivers and a second number of the plurality of n-channel pre-gate drivers based on the first digital value; and
    a look-up table (LUT) associating a plurality of output voltages and a plurality of drive strength parameters of the at least one floating gate driver, wherein the control logic is to execute firmware to read the first digital value and configure a first drive strength parameter of the at least one floating gate driver dynamically based on the first digital value, wherein the first and second numbers are associated with the first drive strength parameter.

9. The system of claim 8, wherein the control logic is to perform a lookup operation in the LUT, using the first digital value, to determine the first drive strength parameter of the at least one floating gate driver.

10. The system of claim 9, wherein:
the ADC is to generate a second digital value representing a second output voltage of the DC-to-DC converter;
the control logic is to perform a second lookup operation in the LUT, using the second digital value, to determine a second drive strength parameter of the at least one floating gate driver based on the second output voltage, wherein the second drive strength parameter is associated with a third number of the plurality of p-channel pre-gate drivers to activate and a fourth number of the plurality of n-channel pre-gate drivers to activate; and
the control logic is to send one or more second control signals to activate the third number of the plurality of p-channel pre-gate drivers and the fourth number of the plurality of n-channel pre-gate drivers based on the second output voltage.

11. The system of claim 8, wherein the DC-to-DC converter is a buck-boost converter comprising a first high-side switch, a second high-side switch, a first low-side switch, and a second low-side switch, wherein the at least one floating gate driver comprises:
a first floating gate driver coupled to drive the first high-side switch and the first low-side switch according to the first drive strength parameter associated with the output voltage; and
a second floating gate driver coupled to drive the second high-side switch and the second low-side switch according to the first drive strength parameter.

12. The system of claim 11, wherein:
the control logic is to determine a second drive strength parameter based on a second output voltage of the DC-to-DC converter;
the first floating gate driver to drive the first high-side switch and the first low-side switch according to the second drive strength parameter; and
the second floating gate driver coupled to drive the second high-side switch and the second low-side switch according to the second drive strength parameter.

13. The system of claim 8, further comprising:
a second DC-to-DC converter; and
a second set of one or more floating gate drivers coupled to the second DC-to-DC converter, the second set of one or more floating gate drivers comprising:
a second plurality of p-channel FETs coupled in parallel between a fourth terminal and a fifth terminal, the fourth and fifth terminals being coupled to the second DC-to-DC converter;
a second plurality of p-channel pre-gate drivers, each p-channel pre-gate driver being coupled to a gate of one of the second plurality of p-channel FETs;
a second plurality of n-channel FETs coupled in parallel between the fifth terminal and a sixth terminal, the fifth and sixth terminals being coupled to the second DC-to-DC converter;
a second plurality of n-channel pre-gate drivers, each n-channel pre-gate driver being coupled to a gate of one of the second plurality of n-channel FETs; and
a second ADC to generate a second digital value representing an output voltage of the second DC-to-DC converter,
wherein the control logic is to send one or more second control signals to activate a third number of the second plurality of p-channel pre-gate drivers and a fourth number of the second plurality of n-channel pre-gate drivers based on the second digital value.

14. The system of claim 8, wherein the power controller is a Universal Serial Bus Type-C (USB-C) controller.

15. A method of operating a Universal Serial Bus Type-C (USB-C) controller coupled to a buck-boost converter, the method comprising:
measuring a first output voltage of the buck-boost converter;
generating a first digital value of the first output voltage;
determining a first drive strength parameter based on the first digital value, wherein determining the first drive strength parameter comprises performing a first lookup operation, using the first digital value, to determine the first drive strength parameter;
sending one or more first control signals to a first number of a plurality of p-channel pre-gate drivers, each of the plurality of p-channel pre-gate drivers coupled to a different gate a plurality of p-channel field-effect transistors (FETs) coupled in parallel between a first terminal and a second terminal of the USB-C controller; and
sending one or more second control signals to a second number of a plurality of n-channel pre-gate drivers, each of the plurality of n-channel pre-gate drivers coupled to a different gate of a plurality of n-channel FETs coupled in parallel between the second terminal and a third terminal of the USB-C controller, wherein the first number and the second number are associated with the first drive strength parameter.

16. The method of claim 15, further comprising:
sending one or more third control signals to a third number of a second plurality of p-channel pre-gate drivers, each of the second plurality of p-channel pre-gate drivers coupled to one of a second plurality of p-channel FETs coupled in parallel between a fourth terminal and a fifth terminal of the USB-C controller; and
sending one or more fourth control signals to a fourth number of a second plurality of n-channel pre-gate drivers, each of the second plurality of n-channel pre-gate drivers coupled to one of a second plurality of n-channel FETs coupled in parallel between the fifth terminal and a sixth terminal of the USB-C controller.

17. The method of claim 15, further comprising:
measuring a second output voltage of the buck-boost converter;
generating a second digital value of the second output voltage;
performing a second lookup operation, using the second digital value, to determine a second drive strength parameter;
send one or more third control signals to a third number of the plurality of p-channel pre-gate drivers; and
send one or more fourth control signals to a fourth number of the plurality of n-channel pre-gate drivers, wherein the third and fourth numbers are associated with the first drive strength parameter.

* * * * *